(12) United States Patent
Motoyama

(10) Patent No.: US 11,066,281 B2
(45) Date of Patent: Jul. 20, 2021

(54) CONSTRUCTION MACHINE

(71) Applicant: KOBELCO CONSTRUCTION MACHINERY CO., LTD., Hiroshima (JP)

(72) Inventor: Yuudai Motoyama, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 199 days.

(21) Appl. No.: 16/481,089

(22) PCT Filed: Jan. 30, 2018

(86) PCT No.: PCT/JP2018/002964
§ 371 (c)(1),
(2) Date: Jul. 26, 2019

(87) PCT Pub. No.: WO2018/143193
PCT Pub. Date: Aug. 9, 2018

(65) Prior Publication Data
US 2020/0039799 A1 Feb. 6, 2020

(30) Foreign Application Priority Data

Feb. 2, 2017 (JP) .............................. JP2017-017513
Feb. 2, 2017 (JP) .............................. JP2017-017515

(51) Int. Cl.
*B66C 23/74* (2006.01)
*B60R 3/00* (2006.01)
*B66C 23/62* (2006.01)

(52) U.S. Cl.
CPC .............. *B66C 23/74* (2013.01); *B60R 3/005* (2013.01); *B66C 23/62* (2013.01)

(58) Field of Classification Search
CPC ......... B60R 3/005; B66C 23/72; B66C 23/74; B66C 2700/0392; B66C 23/62; B66C 23/365; B62D 49/085; E02F 9/18
See application file for complete search history.

(56) References Cited

U.S. PATENT DOCUMENTS 3,051,325 A * 8/1962 Risto .................. B66C 23/62
                                                              212/195
6,296,436 B1   10/2001 Ramun
(Continued)

FOREIGN PATENT DOCUMENTS

EP    2 474 672 A1   7/2012
GB    2 014 537 A    8/1979
(Continued)

OTHER PUBLICATIONS https://www.j-platpat.inpit.go.jp/, machine translation of JP2001171977, Mar. 23, 2021 (Year: 2021).*
(Continued)

*Primary Examiner* — Sang K Kim
*Assistant Examiner* — Nathaniel L Adams
(74) *Attorney, Agent, or Firm* — Oblon, McClelland, Maier & Neustadt, L.L.P.

(57) ABSTRACT

A construction machine allows a worker to easily move between one pair of side frames through a travelling body weight. The construction machine includes a lower travelling body of a crane includes a truck frame, a left side frame and a right side frame, a front weight and a rear weight, and scaffolding members. Scaffolding upper surface parts of the scaffolding members and upper surface parts of the front weight and the rear weight are disposed in line with each other along a left and right direction, and form a moving passage that allows the worker to move between the left and right side frames.

15 Claims, 29 Drawing Sheets

(56) References Cited

U.S. PATENT DOCUMENTS

| | | | |
|---|---|---|---|
| 2011/0192815 A1* | 8/2011 | Kurotsu | B66C 23/76 |
| | | | 212/196 |
| 2018/0022585 A1* | 1/2018 | Miyazaki | B66C 23/76 |
| | | | 212/305 |
| 2019/0390440 A1* | 12/2019 | Motoyama | B66C 23/74 |
| 2020/0407200 A1* | 12/2020 | Okubo | B66C 23/74 |

FOREIGN PATENT DOCUMENTS

| | | |
|---|---|---|
| JP | 11-131529 A | 5/1999 |
| JP | 2000-255986 A | 9/2000 |
| JP | 2001-171977 A | 6/2001 |
| JP | 2006-219241 A | 8/2006 |
| JP | 2012-197155 A | 10/2012 |
| WO | WO 2011/027765 A1 | 3/2011 |

OTHER PUBLICATIONS https://www.j-platpat.inpit.go.jp/, machine translation of JP2006219241, Mar. 23, 2021 (Year: 2021).*

International Search Report dated May 1, 2018 in PCT/JP2018/002964 filed on Jan. 30, 2018.

Extended European Search Report dated Jan. 7, 2020 in European Patent Application No. 18748050.4, 8 pages.

* cited by examiner

CONSTRUCTION MACHINE

TECHNICAL FIELD

The present invention relates to a construction machine including one pair of left and right side frames.

BACKGROUND ART

Conventionally, as a mobile construction machine like a crawler crane, a construction machine including an upper slewing body and a lower travelling body is known. The lower travelling body includes a truck frame and one pair of left and right side frames coupled to the truck frame. The upper slewing body includes a work device and is supported by the truck frame of the lower travelling body in a slewable manner.

Patent Literature 1 discloses a technique in which a lower-weight is disposed between one pair of side frames in order to enhance stability of a machine body of a construction machine. In the technique, a truck frame includes a jackup cylinder and a jack beam supporting the jackup cylinder. The lower-weight is supported by the jack beam.

Also, the lower-weight includes a lower weight and one pair of upper weights. The one pair of upper weights is fixed to an upper surface part of the lower weight spaced apart from each other in a left and right direction. Both ends of the upper weight in a left and right direction are each disposed close to the one pair of side frames. After moving from the ground to the upper surface part of the lower weight, a worker can move from the upper surface part of the lower weight to an upper surface part of the upper weight. Then, a moving passage is formed between the one pair of side frames through the upper surface part of the lower-weight.

CITATION LIST

Patent Literature

Patent Literature 1: Japanese Patent Application Laid-Open No. 2006-219241

In the technique described in Patent Literature 1, there is a step between the one pair of upper weights and the lower weight, and accordingly, the worker needs to move with attention to the step when the worker moves between the one pair of side frames.

SUMMARY OF INVENTION

The present invention has been made in view of the above problem, and an object of the present invention is to provide a construction machine that allows a worker to easily move between one pair of side frames through a travelling body weight installed in a truck frame.

A construction machine is provided. The construction machine includes: a lower travelling body configured to move on ground; and an upper slewing body supported by the lower travelling body in a slewable manner. The lower travelling body includes: a truck frame including a front surface part and a rear surface part, the truck frame supporting the upper slewing body; one pair of left and right side frames each supporting a crawler that allows circling movement, the one pair of left and right side frames being respectively coupled to both ends of a left and right direction of the truck frame to extend in a front and rear direction more than the truck frame; one pair of front and rear travelling body weights being respectively disposed on a front side and a rear side of the truck frame between the one pair of left and right side frames; and at least one pair of front and rear scaffolding members each including a scaffolding upper surface part facing upward and being respectively installed in the one pair of front and rear travelling body weights. Each of the one pair of front and rear travelling body weights includes a weight upper surface part facing upward, and one pair of left and right weight side surfaces respectively disposed facing the one pair of side frames. The scaffolding members are installed in the travelling body weights such that the scaffolding members project to sides of the side frames more than the weight side surfaces and the scaffolding upper surface parts and the weight upper surface part are in line with each other along the left and right direction. The scaffolding upper surface parts and the weight upper surface part form a moving passage that allows a worker to move between the one pair of left and right side frames.

DESCRIPTION OF EMBODIMENTS

Figure 1:
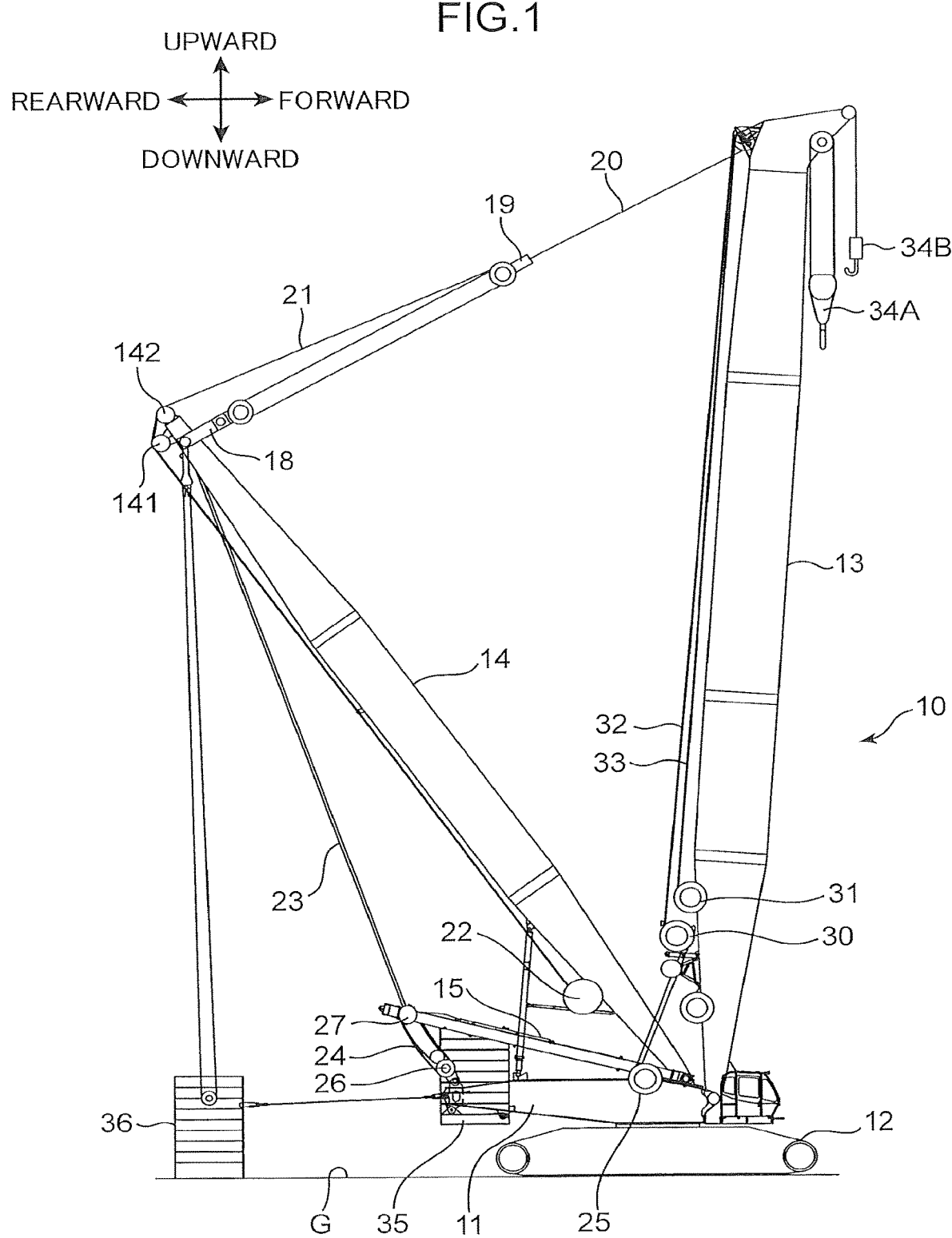
FIG. 1 is a side view of a construction machine according to a first embodiment of the present invention.

Embodiments of the present invention will be described below with reference to the drawings. FIG. 1 is a side view of a crane 10 (construction machine) according to a first embodiment of the present invention. Note that hereinafter, each figure shows directions of "upward", "downward", "leftward", "rightward", "forward", and "rearward", but these directions are shown for convenience for describing structure and a method of assembling the crane 10 according to the present embodiment, and do not limit the structure, the method of assembling, a usage mode, and the like of the construction machine according to the present invention.

The crane 10 includes an upper slewing body 11 corresponding to a crane body, a lower travelling body 12 that supports the upper slewing body 11 in a slewable manner and can travel on the ground, a boom 13 that functions as a derricking member, a lattice mast 14 that is a boom derricking member, and a box mast 15.

The boom 13 is pivotably supported by the upper slewing body 11 to enable derricking around a horizontal axis. The lattice mast 14 is pivotally supported by the upper slewing body 11 around a pivotal axis parallel to a pivotal axis of the boom 13 at a rear position of the boom 13. The lattice mast 14 serves as a strut for pivoting the boom 13. The box mast 15 has a proximal end and a pivoting end (tip), and is pivotably coupled to the upper slewing body 11 on a rear side of the lattice mast 14. A pivotal axis of the box mast 15 is disposed parallel to the pivotal axis of the boom 13 at substantially the same position as the pivotal axis of the lattice mast 14.

Furthermore, the crane 10 includes a lower spreader 18, an upper spreader 19, a guy line 20, a boom derricking rope 21, and a boom derricking winch 22. The guy line 20 connects the upper spreader 19 to a tip of the boom 13. The boom derricking rope 21 is pulled out from the boom derricking winch 22, looped over a first mast sheave 141 and a second mast sheave 142 at a tip of the lattice mast 14, and then looped between a sheave block of the lower spreader 18 and a sheave block of the upper spreader 19 multiple times. The boom derricking winch 22 changes a distance between the sheave block of the lower spreader 18 and the sheave block of the upper spreader 19 by winding and delivering the boom derricking rope 21, and derricks the boom 13 while pivoting the boom 13 with respect to the lattice mast 14.

Furthermore, the crane 10 includes a guy line 23, a mast derricking rope 24, and a mast derricking winch 25. The guy line 23 connects the tip of the lattice mast 14 to a pivotal end of the box mast 15. The mast derricking rope 24 is looped multiple times between a sheave block 26 disposed in the upper slewing body 11 and a sheave block 27 disposed in the pivotal end of the box mast 15. The mast derricking winch 25 winds and delivers the mast derricking rope 24 and changes a distance between the sheave block 26 and the sheave block 27. As a result, while the box mast 15 and the lattice mast 14 pivot integrally with respect to the upper slewing body 11, the lattice mast 14 is derricked.

A main winding winch 30 and an auxiliary winding winch 31 for winding up and down loads are mounted on the crane 10. The main winding winch 30 winds up and down a load with a main winding rope 32. A main hook 34A for a load is coupled to the main winding rope 32 hanging down from the tip of the boom 13. When the main winding winch 30 winds and delivers the main winding rope 32, the main hook 34A is wound up and down. Similarly, the auxiliary winding winch 31 winds up and down a load with an auxiliary hook 34B connected to an auxiliary winding rope 33.

A counter weight 35 is mounted rearward of the upper slewing body 11 to adjust the balance of the crane 10. A pallet weight 36 is further disposed behind the upper slewing body 11.

<About Lower Travelling Body>

Figure 2:
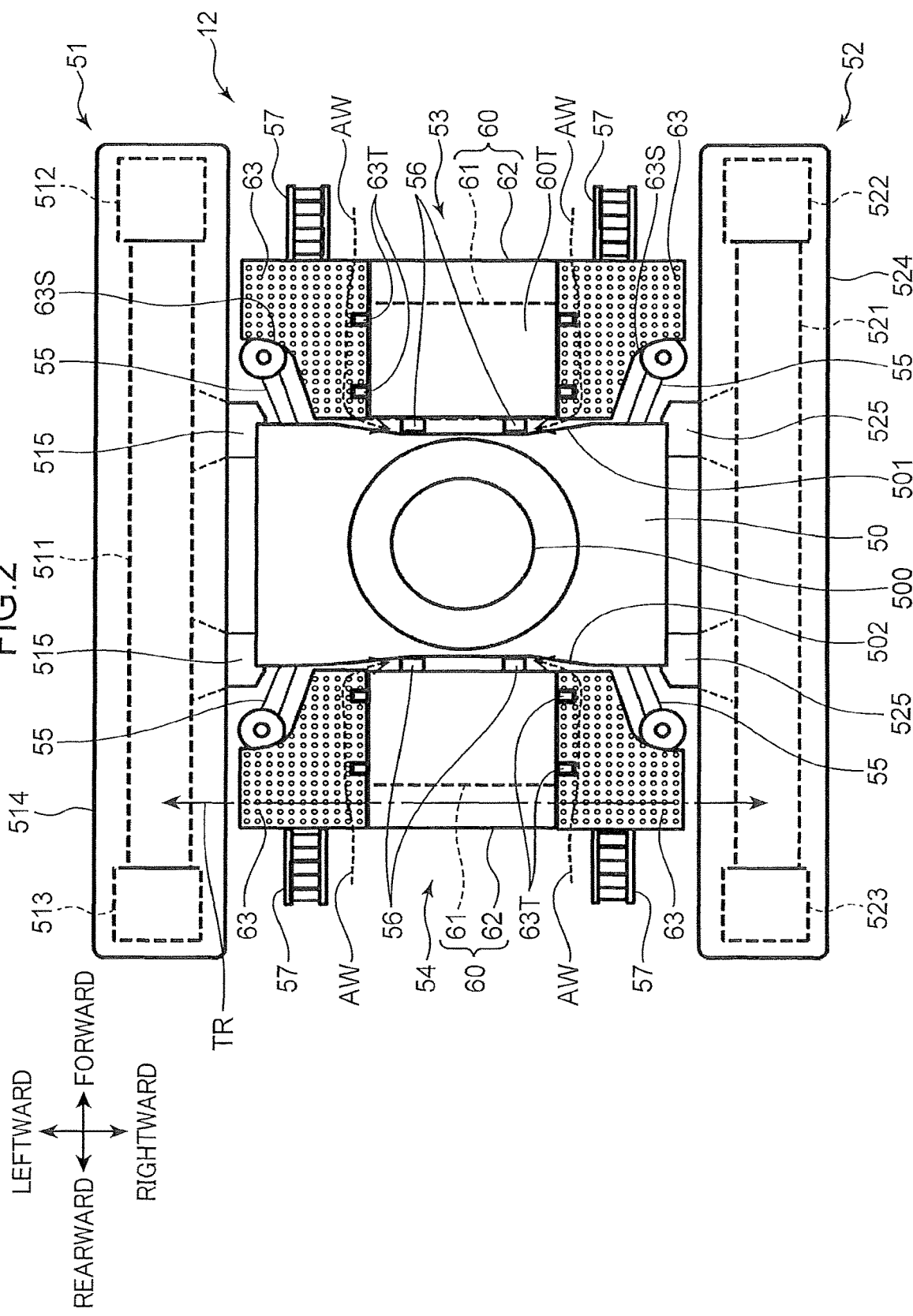
FIG. 2 is a plan view of a lower travelling body of the construction machine according to the first embodiment of the present invention.
Figure 3:
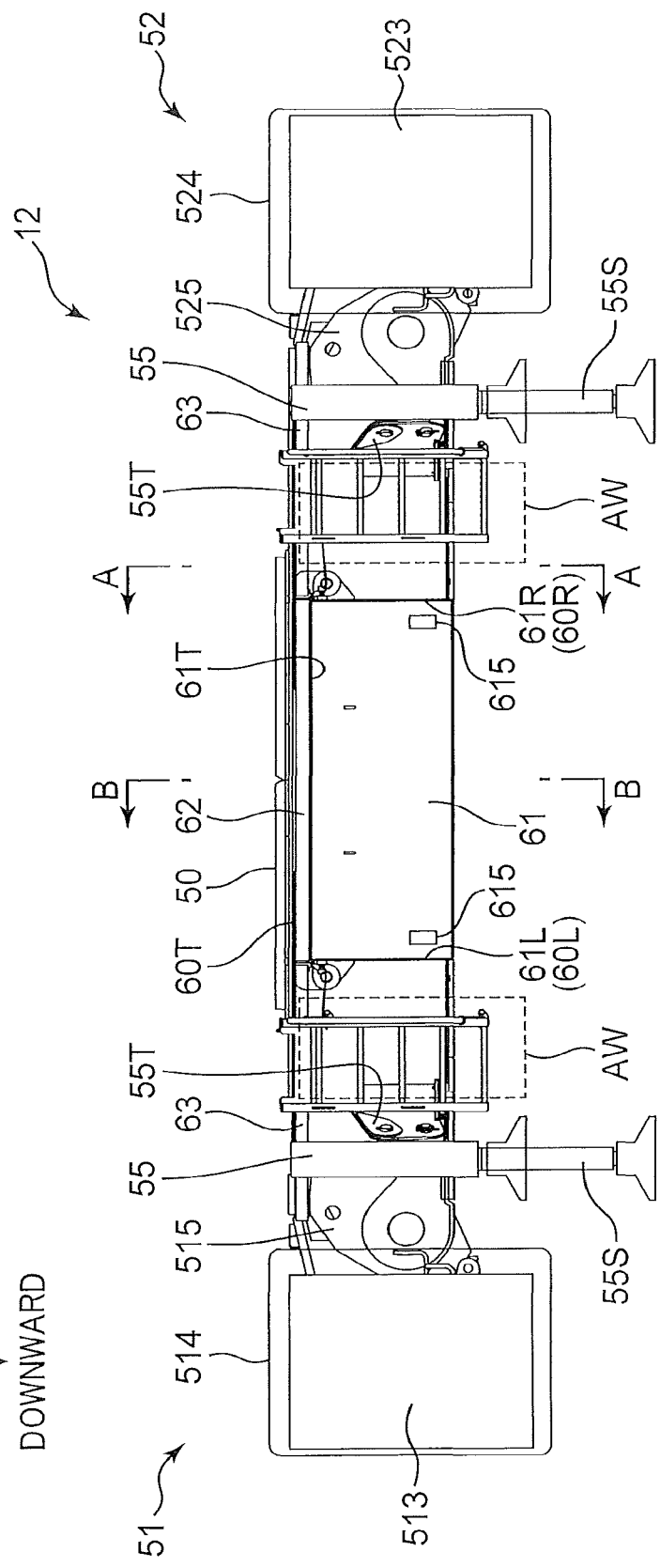
FIG. 3 is a rear view of the lower travelling body of the construction machine according to the first embodiment of the present invention.
Figure 4:
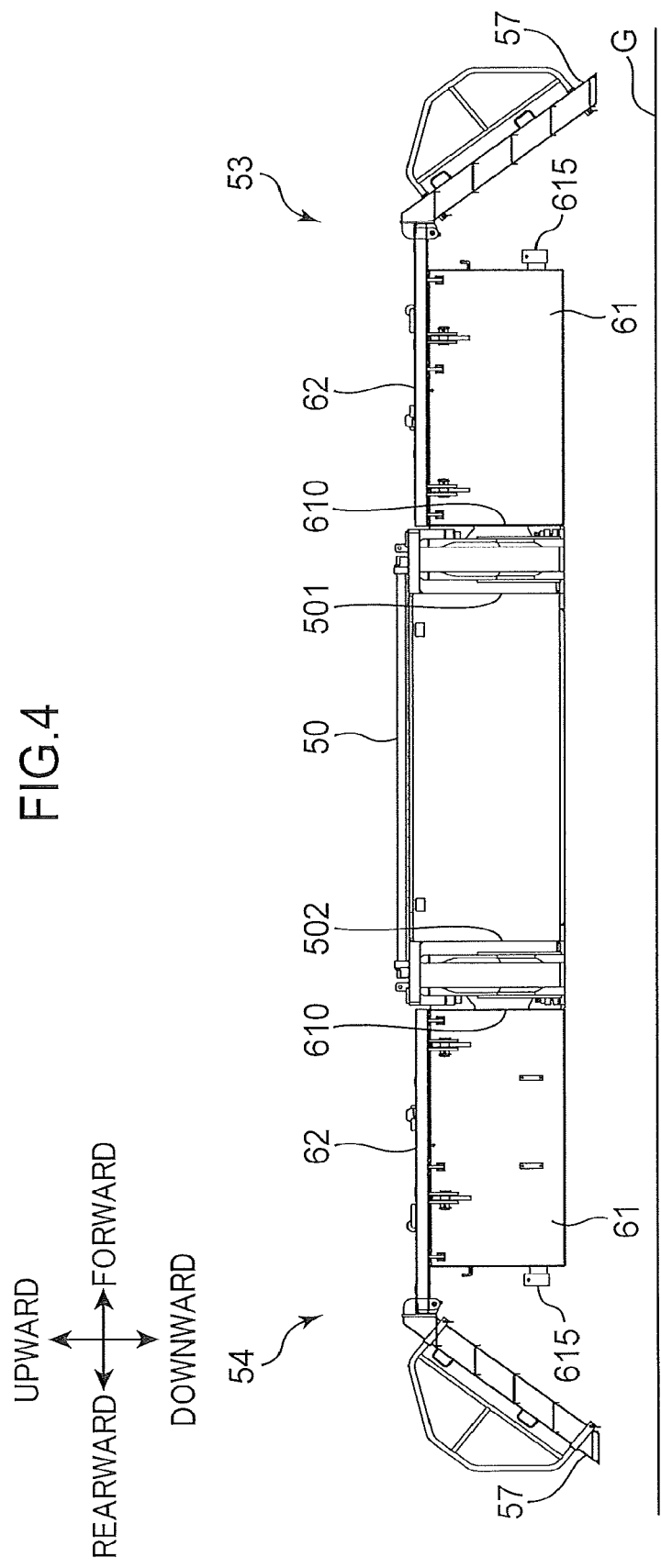
FIG. 4 is a side cross-sectional view of the lower travelling body of the construction machine according to the first embodiment of the present invention, and is a cross-sectional view at a B-B position of FIG. 3.

Next, structure of the lower travelling body 12 of the crane 10 according to the present embodiment will be described in more detail. FIG. 2 is a plan view of the lower travelling body 12 of the crane 10 according to the present embodiment. FIG. 3 is a rear view of the lower travelling body 12. Furthermore, FIG. 4 is a side cross-sectional view of the lower travelling body 12, and is a cross-sectional view at a B-B position of FIG. 3. Note that FIGS. 1 and 4 illustrate the ground G.

The lower travelling body 12 includes a truck frame 50 (also referred to as a car body), a left crawler unit 51, a right crawler unit 52, a front weight 53 (travelling body weight), a rear weight 54 (travelling body weight), a plurality of coupling parts 56, two pairs of front and rear scaffolding members 63, and one pair of front and rear ladders 57.

The truck frame 50 is disposed in a central portion of the lower travelling body 12 and has a function to support the upper slewing body 11. The truck frame 50 has a generally rectangular shape including a front surface part 501 and a rear surface part 502. In addition, a slewing body axis support part 500 is disposed on an upper surface part of the truck frame 50. The upper slewing body 11 is installed in a slewable manner on the slewing body axis support part 500.

The left crawler unit 51 and the right crawler unit 52 are coupled to the left and right of the truck frame 50, respectively. The left crawler unit 51 includes a left side frame 511 (side frame), a left driving roller 512, a left driven roller 513, left crawler shoes 514 (crawler), and one pair of left frame coupling parts 515. Similarly, the right crawler unit 52 includes a right side frame 521 (side frame), a right driving roller 522, a right driven roller 523, right crawler shoes 524 (crawler), and one pair of right frame coupling parts 525.

The left side frame 511 and the right side frame 521 support the left crawler shoes 514 and the right crawler shoes 524 respectively so as to allow circling movement. The left side frame 511 and the right side frame 521 are respectively coupled to both ends of the left and right direction of the truck frame 50 through the left frame coupling parts 515 and the right frame coupling parts 525 so as to extend in a front and rear direction more than the truck frame 50. The left side frame 511 and the right side frame 521 constitute one pair of left and right side frames of the present invention. The left driving roller 512 and the right driving roller 522 are rotatably supported at front ends of the left side frame 511 and the right side frame 521 and drive the left crawler shoes 514 and the right crawler shoes 524, respectively, in response to driving force of a (not shown) driving mechanism. The left driven roller 513 and the right driven roller 523 are rotatably supported at rear ends of the left side frame 511 and the right side frame 521, respectively.

The front weight 53 and the rear weight 54 are disposed on a front side and a rear side of the truck frame 50, respectively, between the left side frame 511 and the right side frame 521. In more detail, the front weight 53 and the rear weight 54 are coupled to the front surface part 501 and the rear surface part 502 of the truck frame 50, respectively, between the left side frame 511 and the right side frame 521. These weights are installed in the truck frame 50 to maintain balance of the crane 10. The front weight 53 and the rear weight 54 constitute one pair of front and rear travelling body weights of the present invention. The front weight 53 and the rear weight 54 are coupled to the truck frame 50 via the plurality of coupling parts 56 of FIG. 2. The coupling parts 56 each include an upper coupling part 561 and a lower coupling part 562 (see FIG. 5). Note that in other embodiments, the front weight 53 and the rear weight 54 may be coupled to the front surface part 501 and the rear surface part 502 of the truck frame 50 through other support members, respectively, between the left side frame 511 and the right side frame 521.

One pair of front scaffolding members 63 is installed in the front weight 53. One pair of rear scaffolding members 63 is installed in the rear weight 54.

The truck frame 50 further includes two pairs of front and rear jack up devices 55 provided on the front surface part 501 and the rear surface part 502, respectively.

The two pairs of jack up devices 55 have a function to support the lower travelling body 12. As shown in FIG. 2, these jack up devices 55 are disposed to project frontward and rearward from both ends of the front surface part 501 and the rear surface part 502, respectively. Note that the two pairs of jack up devices 55 on a front side and a rear side of the truck frame 50 are disposed at positions sandwiching an upper frame coupling part 503 and a lower frame coupling part 504 (FIG. 5), to be described later, from both sides of the left and right direction. Each jack up device 55 includes a jack up cylinder 55S and a jack up support member 55T for supporting the jack up cylinder 55S (see FIG. 3). The jack up cylinder 55S can expand and contract along the vertical direction by hydraulic pressure. An expansion operation of the plurality of jack up devices 55 allows the jack up devices 55 to support the lower travelling body 12 in a posture in which the left crawler unit 51 and the right crawler unit 52 are lifted from the ground (FIG. 3). Note that each of the front weight 53 and the rear weight 54 is disposed at a position sandwiched by the pair of jack up devices 55 from both sides of the left and right direction (FIG. 2).

<About Travelling Body Weight>

Figure 5:
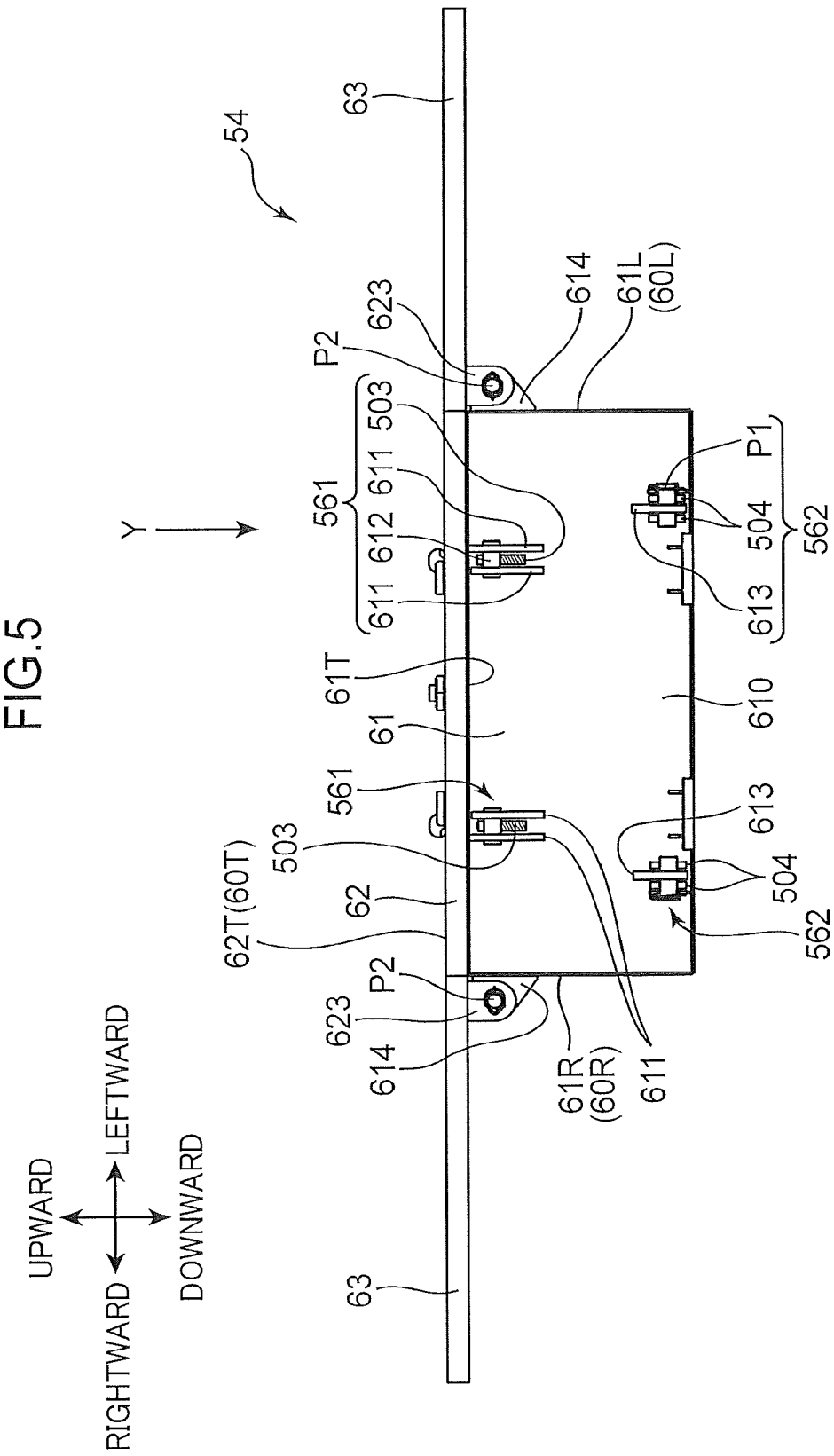
FIG. 5 is a front view of a travelling body weight and scaffolding members according to the first embodiment of the present invention when viewed from a truck frame side.
Figure 6:
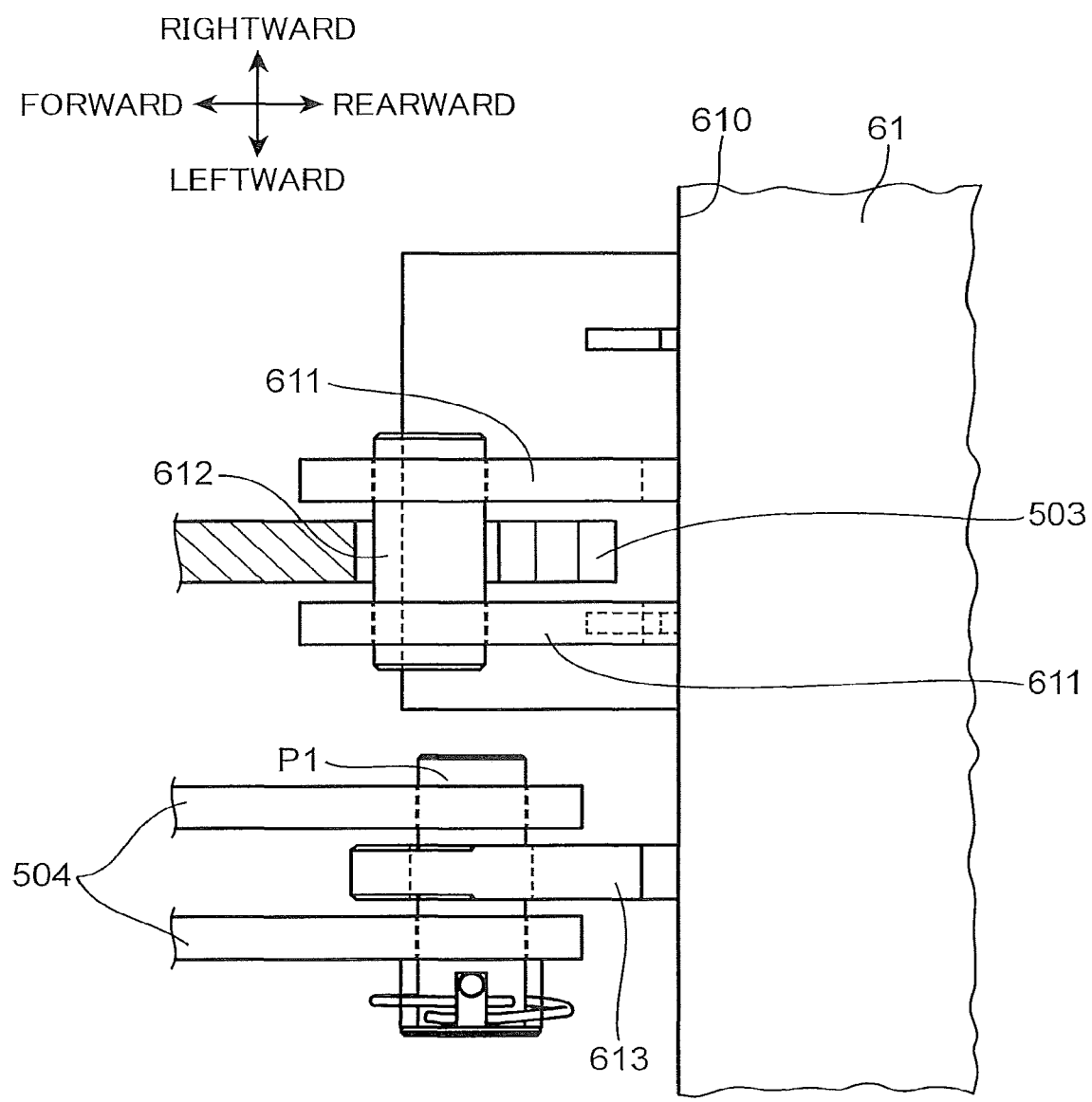
FIG. 6 is an enlarged plan view of the travelling body weight of FIG. 5 when viewed from a viewpoint Y.
Figure 7:
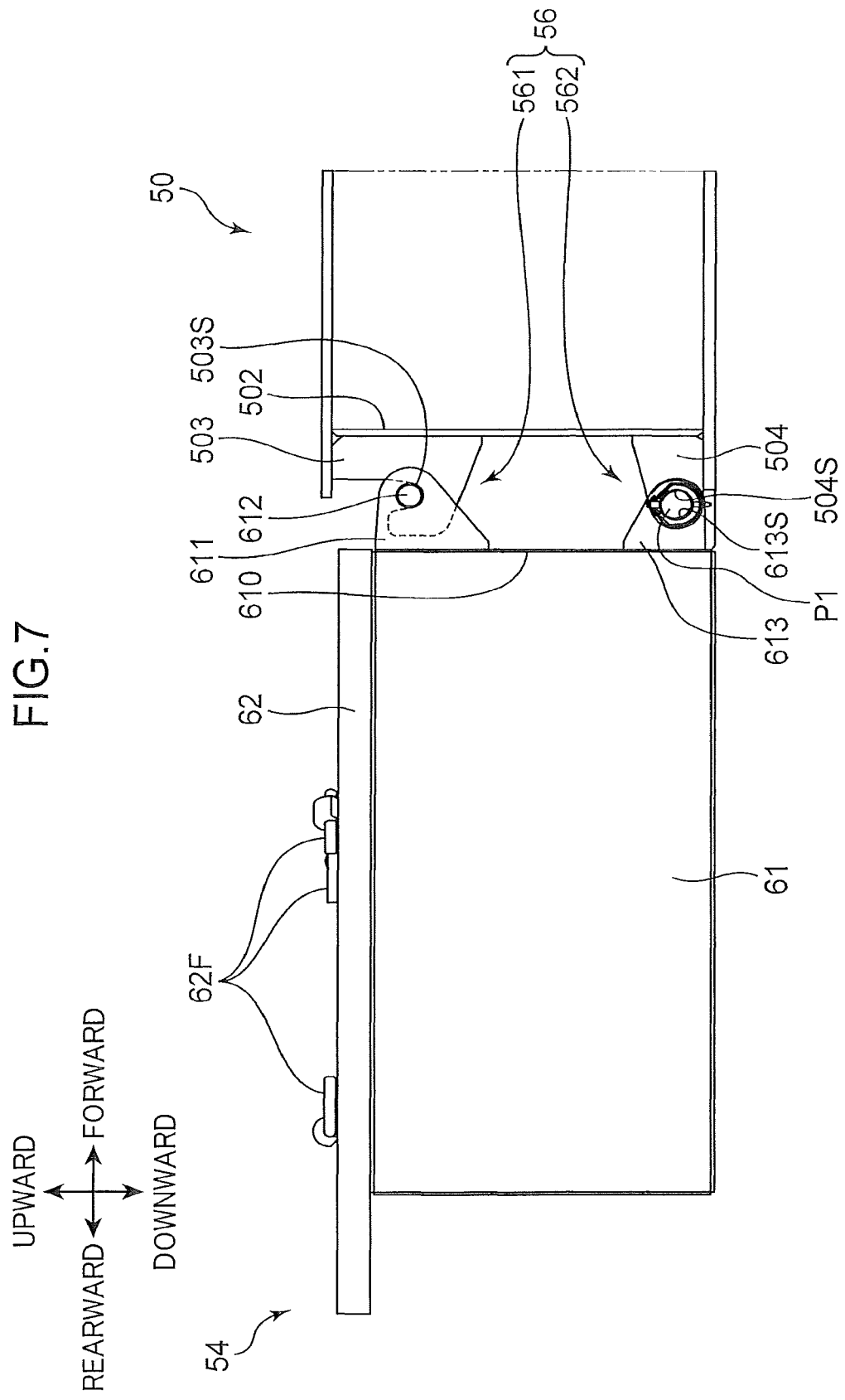
FIG. 7 is a side view showing coupling parts in which the travelling body weight and the truck frame according to the first embodiment of the present invention are coupled to each other.
Figure 8:
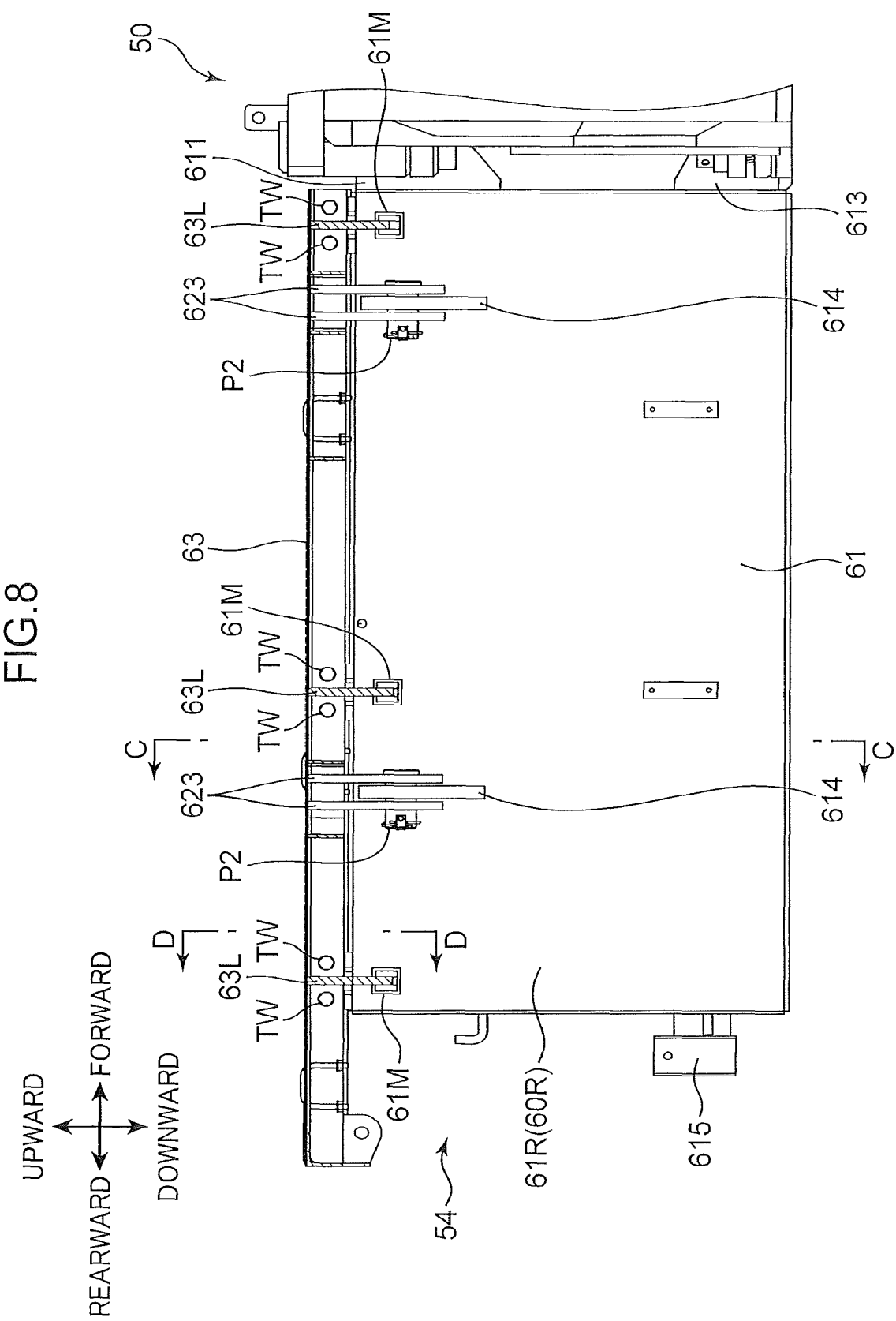
FIG. 8 is a side cross-sectional view showing the travelling body weight and the scaffolding member according to the first embodiment of the present invention, and is a cross-sectional view at an A-A position of FIG. 3.
Figure 9:
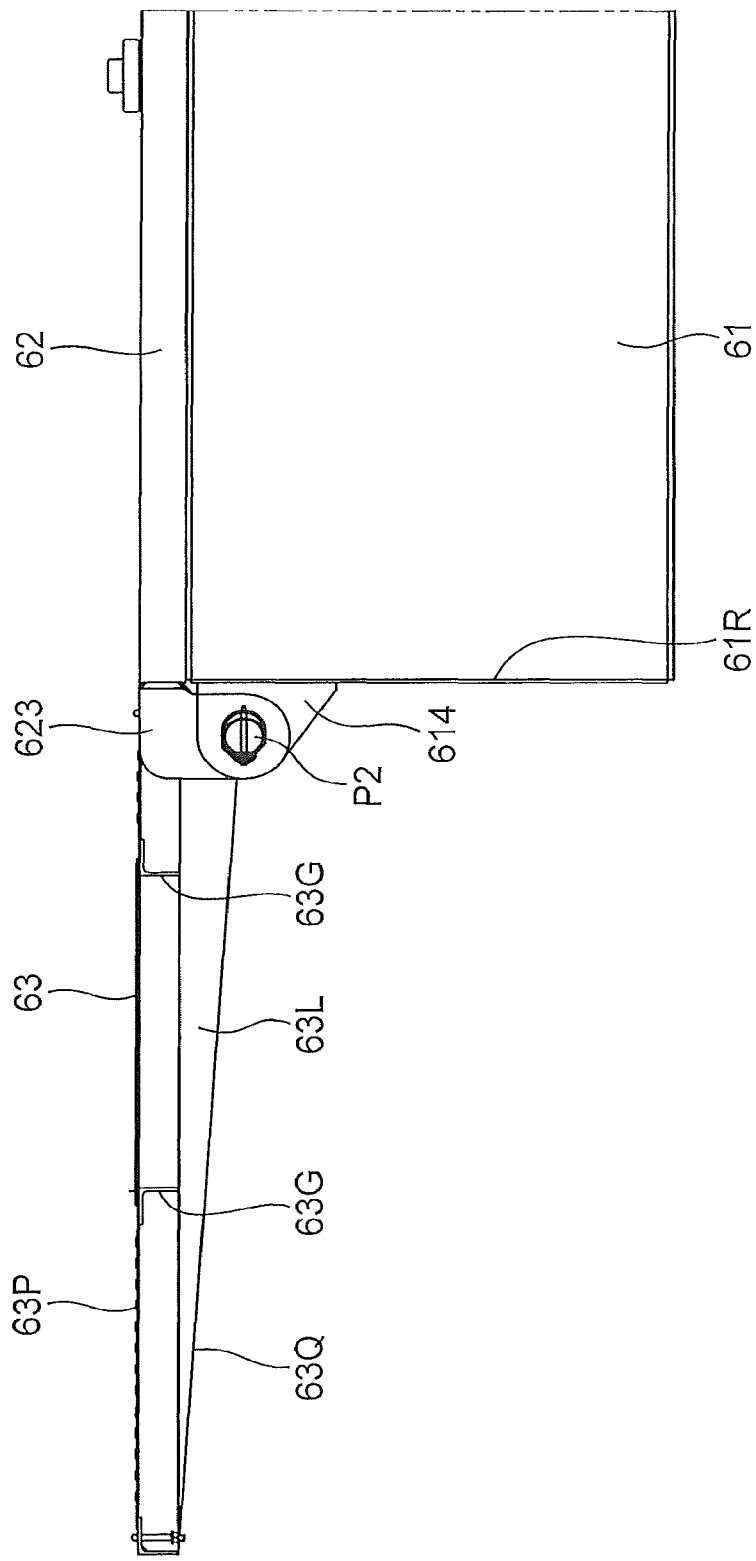
FIG. 9 is a cross-sectional view showing the travelling body weight and the scaffolding member according to the first embodiment of the present invention, and is a cross-sectional view at a C-C position of FIG. 8.
Figure 10:
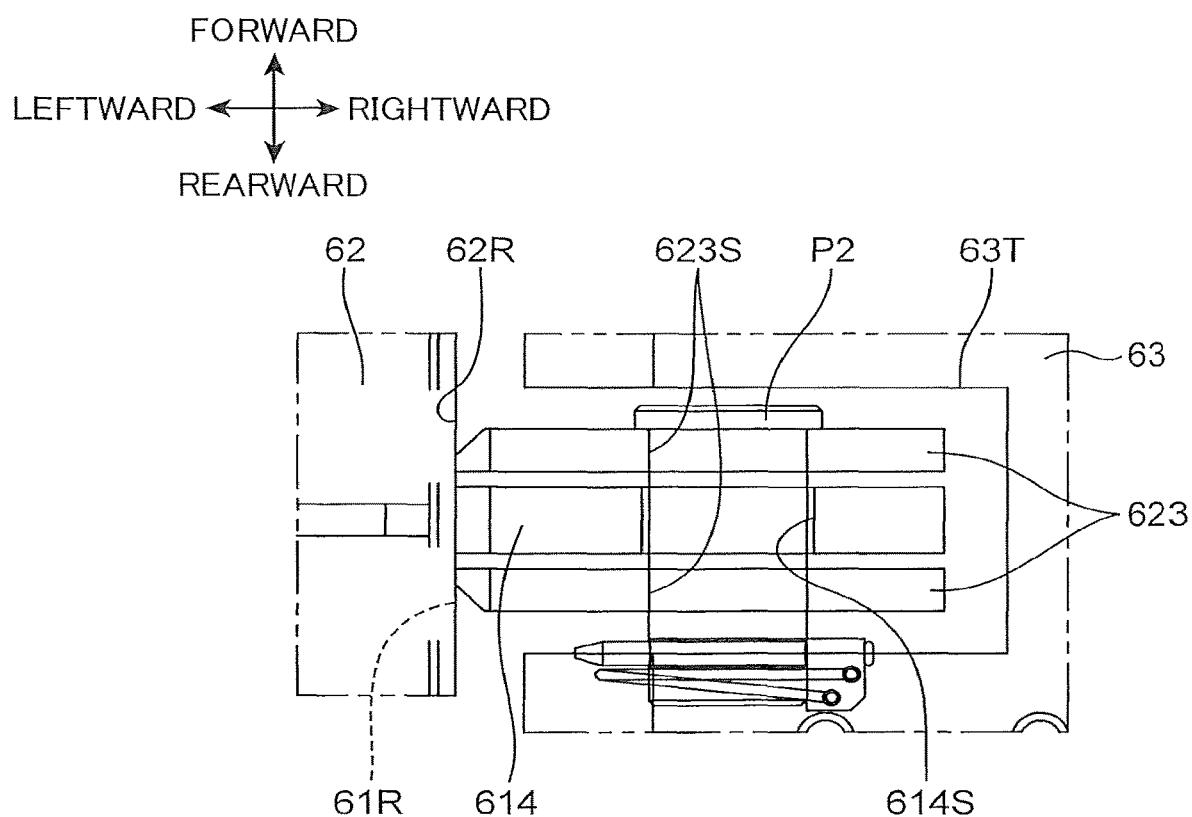
FIG. 10 is an enlarged plan view of a coupling part in which an upper weight and a lower weight of the travelling body weight according to the first embodiment of the present invention are coupled to each other.
Figure 11:
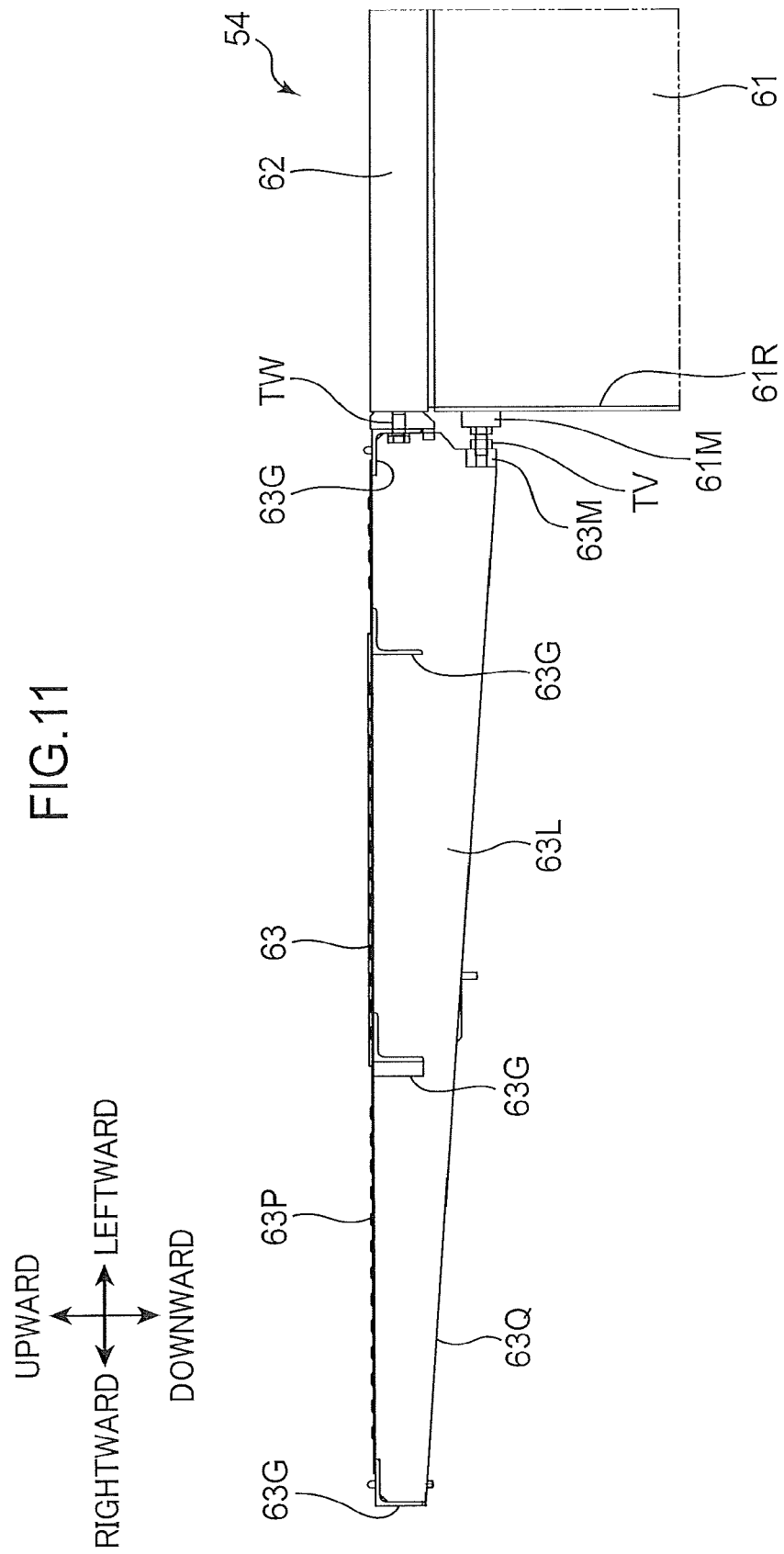
FIG. 11 is a side cross-sectional view showing the travelling body weight and the scaffolding member according to the first embodiment of the present invention, and is a cross-sectional view at a D-D position of FIG. 8.

In the present embodiment, structure and coupling structure to the truck frame 50 are the same between the front weight 53 and the rear weight 54. Therefore, the following describes the structure of the rear weight 54 and the coupling structure of the rear weight 54 to the truck frame 50 as an example. FIG. 5 is a front view of the rear weight 54 (travelling body weight) and the one pair of scaffolding members 63 according to the present embodiment when viewed from a truck frame 50 side. FIG. 6 is an enlarged plan view of the rear weight 54 of FIG. 5 when viewed from a viewpoint Y. FIG. 7 is a side view showing the coupling parts 56 in which the rear weight 54 and the truck frame 50 are coupled to each other. FIG. 8 is a side cross-sectional view showing the rear weight 54 and the scaffolding member 63, and is a cross-sectional view at an A-A position of FIG. 3. FIG. 9 is a cross-sectional view showing the rear weight 54 and the scaffolding member 63, and is a cross-sectional view at a C-C position of FIG. 8. FIG. 10 is an enlarged plan view of a coupling part in which an upper weight 62 and a lower weight 61, to be described later, of the rear weight 54 are coupled to each other. FIG. 11 is a side cross-sectional view showing the rear weight 54 and the scaffolding member 63, and is a cross-sectional view at a D-D position of FIG. 8.

The rear weight 54 includes a weight body 60 (FIG. 2).

The weight body 60 is a heavy object having a generally rectangular shape. The weight body 60 includes a weight upper surface part 60T facing upward and one pair of weight side surfaces (weight right side surface 60R and weight left side surface 60L) (FIGS. 3 and 5). The weight upper surface part 60T is an upper surface part of the weight body 60. The weight right side surface 60R and the weight left side surface 60L are left and right side surfaces of the weight body 60, and are disposed to face the one pair of left and right side frames 511 and 521, respectively.

Also, the weight body 60 includes the lower weight 61 and the upper weight 62.

The lower weight 61 is a heavy object having a generally rectangular shape, and constitutes a lower end side of the weight body 60. The lower weight 61 includes a lower weight upper surface part 61T (FIG. 5) (upper surface part) facing upward, one pair of side surfaces (lower weight left side surface 61L and lower weight right side surface 61R: FIG. 5), and an opposite surface 610 (FIGS. 5 and 7). The lower weight left side surface 61L and the lower weight right side surface 61R are disposed to face the left side frame 511 and the right side frame 521, respectively. The opposite surface 610 couples the lower weight left side surface 61L to the lower weight right side surface 61R in the left and right direction, and is disposed to face the rear surface part 502 of the truck frame 50 (FIG. 7).

The upper weight 62 (FIGS. 3 and 5) is a plate-shaped heavy object that is detachably installed on the lower weight upper surface part 61T of the lower weight 61 and constitutes an upper end side of the weight body 60. The upper weight 62 includes an upper weight upper surface part 62T (upper surface part) facing upward (FIG. 5). Note that as shown in FIGS. 2 and 7, a rear end side of the upper weight 62 is disposed to project rearward from the lower weight 61. Moreover, both ends (side surfaces) of the left and right direction of the upper weight 62 are disposed to be flush with both ends of the left and right direction of the lower weight 61 (lower weight left side surface 61L and lower weight right side surface 61R) along the upper and lower direction. Note that in other embodiments, the both ends (side surfaces) of the left and right direction of the upper weight 62 may be disposed inside of the left and right direction of the both ends of the left and right direction of the lower weight 61. As one example, in the present embodiment, the upper weight 62 is a 2.5-ton heavy object. Thus, since the rear weight 54 can be separated into two upper and lower weights, ease of transportation of the rear weight 54 improves.

<Coupling of Travelling Body Weight and Truck Frame>

The lower weight 61 further includes one pair of left and right upper weight coupling parts 611 (weight side coupling parts) (FIG. 5), one pair of left and right lower weight coupling parts 613 (weight side coupling parts) (FIG. 5), and one pair of left and right storage parts 615 (FIG. 3). The upper weight coupling parts 611 and the lower weight coupling parts 613 constitute the coupling parts 56 of the present embodiment (FIG. 2).

Each of the one pair of upper weight coupling parts 611 (FIG. 5) is disposed to project from the upper end of the opposite surface 610 toward the truck frame 50 (FIG. 7). The one pair of upper weight coupling parts 611 is disposed spaced apart from each other in the left and right direction. Also, each upper weight coupling part 611 includes two plate-shaped parts and a shaft part 612 disposed to connect the two plate-shaped parts (FIGS. 5 to 7). The upper weight coupling part 611 is coupled to the upper frame coupling part 503 of the truck frame 50 (FIGS. 6 and 7).

Each of the one pair of lower weight coupling parts 613 (FIG. 5) is disposed to project from the lower end of the opposite surface 610 toward the truck frame 50 (FIG. 7). The one pair of lower weight coupling parts 613 is disposed spaced apart from each other in the left and right direction. Each lower weight coupling part 613 includes one plate-shaped part. Also, in each lower weight coupling part 613, a through hole 613S (second through hole) is opened along the left and right direction (FIGS. 6 and 7). The lower weight coupling part 613 is coupled to the lower frame coupling part 504 of the truck frame 50 (FIGS. 6 and 7).

The one pair of left and right storage parts 615 (FIG. 3) is disposed on both left and right ends of the rear surface part of the lower weight 61, respectively. Each storage part 615 has a cylindrical shape, an upper end of the storage part 615 is opened, and a lower end of the storage part 615 is blocked by a bottom. The storage part 615 can store a coupling pin P1 that couples the lower weight 61 to the truck frame 50 (see FIGS. 5 to 7). Therefore, in a state where the rear weight 54 is not coupled to the truck frame 50, the loss of the coupling pin P1 is prevented.

The truck frame 50 includes, provided on the rear surface part 502, one pair of left and right upper frame coupling parts 503 (frame side coupling parts) (FIG. 7) and one pair of left and right lower frame coupling parts 504 (frame side coupling parts) (FIG. 7). Note that FIG. 5 is a view showing the rear weight 54 and the one pair of scaffolding members 63 from the truck frame 50 side, and the one pair of left and right upper frame coupling parts 503 and lower frame coupling parts 504 provided in the truck frame 50 also appear.

Each of the one pair of upper frame coupling parts 503 is a plate-shaped part projecting toward the lower weight 61 from the upper end of the rear surface part 502 of the truck frame 50. The one pair of upper frame coupling parts 503 is disposed spaced apart from each other in the left and right direction. Each upper frame coupling part 503 includes one plate-shaped part. Also, as shown in FIG. 7, the upper frame coupling part 503 includes a groove part 503S. Since the shaft part 612 of the upper weight coupling part 611 is fitted into the groove part 503S, the upper weight coupling part 611 and the upper frame coupling part 503 are coupled to each other.

Similarly, each of the one pair of lower frame coupling parts 504 is a plate-shaped part projecting from the lower end of the rear surface part 502 of the truck frame 50. The one pair of lower frame coupling parts 504 is disposed spaced apart from each other in the left and right direction. Also, each lower frame coupling part 504 includes two plate-shaped parts. In each plate-shaped part, a through hole 504S (first through hole) is opened (FIG. 7). The lower frame coupling part 504 is coupled by the coupling pin P1 to the lower weight coupling part 613 of the lower weight 61 (FIGS. 6 and 7). In addition, the front surface part 501 of the truck frame 50 is provided with the same coupling parts 56 as the rear surface part 502 (FIG. 2).

<About Coupling of Lower Weight and Upper Weight>

With reference to FIGS. 8 to 10, the lower weight 61 includes a plurality of lower weight connection plates 614. Meanwhile, the upper weight 62 includes a plurality of upper weight connection plates 623.

The plurality of lower weight connection plates 614 is disposed to project from upper ends of the lower weight left side surface 61L and the lower weight right side surface 61R along the left and right direction. Each lower weight connection plate 614 includes a generally triangular shape in rear view of FIG. 9. Note that although not shown in FIG. 9, as shown on the lower weight right side surface 61R side of FIG. 8, in each of the lower weight left side surface 61L and the lower weight right side surface 61R, the plurality of lower weight connection plates 614 is disposed spaced apart from each other in the front and rear direction. Each lower weight connection plate 614 is used to couple the lower weight 61 to the upper weight 62. In the lower weight connection plate 614, a through hole 614S (FIG. 10) is opened along the front and rear direction.

The plurality of upper weight connection plates 623 is disposed to extend downward from the side surface part of the upper weight 62 (see the upper weight right side surface 62R of FIG. 10). In more detail, proximal ends of the upper weight connection plates 623 extend from the side surface of the upper weight 62 along the left and right direction, and tip sides of the upper weight connection plates 623 extend downward. As a result, as shown in FIG. 9, the upper weight connection plates 623 are disposed such that the tips of the lower weight connection plates 614 and the upper weight connection plates 623 overlap each other in rear view. Note that as shown in FIG. 8, on each of the right side and the left side of the upper weight 62, the plurality of upper weight connection plates 623 is disposed spaced apart from each other in the front and rear direction. Also, as shown in FIGS. 8 and 10, the two upper weight connection plates 623 are disposed at positions sandwiching the lower weight connection plate 614 of the lower weight 61 in the front and rear direction. The upper weight connection plates 623 are used to couple the lower weight 61 to the upper weight 62. In the upper weight connection plates 623, through holes 623S (FIG. 10) are opened along the front and rear direction.

By sequentially inserting coupling pins P2 (FIGS. 8 to 10) into the through holes 614S of the lower weight connection plates 614 of the lower weight 61 and the through holes 623S of the upper weight connection plates 623 of the upper weight 62, the lower weight 61 and the upper weight 62 are coupled to each other on both left and right sides of the rear weight 54. Note that as shown in FIG. 5, the upper weight 62 can be easily disposed at an installation position with respect to the lower weight 61 because the left and right upper weight connection plates 623 are disposed at positions sandwiching the lower weight 61. Thus, the present embodiment enables the lower weight 61 and the upper weight 62 to be easily coupled to and separated from each other.

Furthermore, as shown in FIG. 10, a connection cutout 63T having a shape in which part of the scaffolding member 63 is partially cut out so as to surround the lower weight connection plate 614 and the upper weight connection plates 623 is formed in the scaffolding member 63 (FIG. 2). This prevents interference between the connection part of the lower weight 61 to the upper weight 62 and the scaffolding members 63.

<About Scaffolding Members>

The one pair of scaffolding members 63 installed in the rear weight 54 is supported by upper ends of the weight right side surface 60R and the weight left side surface 60L of the weight body 60 (FIG. 5). In more detail, the one pair of scaffolding members 63 is supported by side surfaces of both ends of the left and right direction of the upper weight 62 of the weight body 60. Each scaffolding member 63 mainly includes a metal plate. With reference to FIG. 9, each of the pair of scaffolding members 63 includes a scaffolding upper surface part 63P facing upward and a scaffolding lower surface part 63Q facing downward. Note that the scaffolding lower surface part 63Q corresponds to a back surface part of the scaffolding member 63. A height of the upper and lower direction of the scaffolding member 63 is smaller than a height of the upper and lower direction of the weight body 63. Furthermore, in more detail, the height of the upper and lower direction of the scaffolding member 63 is smaller than the height of the upper and lower direction of the lower weight 61, and is generally the same as the height of the upper and lower direction of the upper weight 62.

A plurality of holes is opened in the scaffolding member 63 to allow the scaffolding upper surface part 63P to communicate with the scaffolding lower surface part 63Q (FIG. 2). The holes enable weight reduction of the scaffolding member 63 and suppress slippage when a worker moves on the scaffolding member 63 because mud or the like attached to worker's shoes falls from the holes of the scaffolding member 63. Note that as one example, in the present embodiment, one scaffolding member 63 weighs 100 kg, and the scaffolding member 63 includes a metal member lighter than the upper weight 62.

Furthermore, the scaffolding member 63 includes a plurality of ribs 63L (FIGS. 8, 9, and 11) and a plurality of angles 63G (FIGS. 9 and 11). The plurality of ribs 63L is disposed spaced apart from each other in the front and rear direction on the scaffolding lower surface part 63Q. Each rib 63L extends along the left and right direction, and has a tapered shape toward the outside of the left and right direction, as shown in FIGS. 9 and 11. The plurality of angles 63G is disposed spaced apart from each other in the left and right direction on the scaffolding lower surface part 63Q. Each of the plurality of angles 63G has an L shape, and extends along the front and rear direction so as to correct the adjacent ribs 63L. The plurality of ribs 63L and the plurality of angles 63G maintain high rigidity and strength of the scaffolding member 63.

With reference to FIG. 11, in the angle 63G disposed in a portion of the scaffolding member 63 closest to the upper weight 62, a bolt hole (not shown) is opened. Then, as shown in FIGS. 8 and 11, a plurality of pairs of fastening bolts TW couples the scaffolding member 63 to the upper weight 62 so as to sandwich each rib 63L from the front and back.

Furthermore, with reference to FIG. 11, a bolt installation part 63M is disposed in a region facing the lower weight 61 in the lower end of each rib 64L. A female hole (not shown) is formed in the bolt installation part 63M. As shown in FIG. 11, since a positioning bolt TV is installed in the female hole of the bolt installation part 63M from a lower weight 61 side, a screw head of the positioning bolt TV is exposed to the lower weight 61 side. Meanwhile, the lower weight 61 includes a plurality of receiving parts 61M spaced apart from each other in the front and rear direction and each having a rectangular shape (FIGS. 8 and 11). Since the screw head of the positioning bolt TV comes into contact with the receiving part 61M, the scaffolding member 63 is positioned.

The one pair of ladders 57 (FIG. 2) can be installed in the left and right scaffolding members 63, and allows the worker to move between the ground and the scaffolding upper surface parts 63P of the scaffolding members 63.

When the rear weight 54 is coupled to the truck frame 50 of the lower travelling body 12, first, the upper weight 62 is installed in the lower weight 61 at a position away from the truck frame 50. The upper weight 62 lifted by an auxiliary crane (not shown) via three hooks 62F (FIG. 7) is placed on the lower weight upper surface part 61T of the lower weight 61. Then, on both the left and right sides of the lower weight 61, the lower weight 61 and the upper weight 62 are fixed to each other with the plurality of coupling pins P2 as described above, whereby the rear weight 54 is assembled. Furthermore, as described above, the one pair of scaffolding members 63 is fixed to the upper weight 62 with the plurality of fastening bolts TW (FIG. 11). As a result, the one pair of scaffolding members 63 is disposed to project outside of the left and right direction from the weight left side surface 60L and the weight right side surface 60R of the weight body 60.

Subsequently, the auxiliary crane lifts the rear weight 54 via the three hooks 62F (FIG. 7) and moves the rear weight 54 to be close to the rear surface part 502 of the truck frame 50. Thus, in the present embodiment, after the lower weight 61 is coupled to the upper weight 62, the upper weight 62 is lifted, whereby the lower weight 61 heavier than the upper weight 62 can be lifted integrally.

After the rear weight 54 is lifted, the shaft part 612 of the lower weight 61 (FIG. 7) is soon fitted into the groove part 503S of the upper frame coupling part 503 of the truck frame 50. Subsequently, the coupling pins P1 are inserted into and fastened to the through hole 613S of the lower weight coupling part 613 and the through hole 504S of the lower frame coupling part 504, whereby the rear weight 54 is coupled to the truck frame 50 and the rear weight 54 is supported by the truck frame 50. Thus, in the present embodiment, the rear weight 54 and the truck frame 50 can be easily coupled to each other with the one pair of left and right coupling pins P1.

When the rear weight 54 is coupled to the truck frame 50, the one pair of scaffolding members 63 is disposed to project to the left side frame 511 side and the right side frame 521 side from the weight left side surface 60L and the weight right side surface 60R of the weight body 60. Furthermore, the scaffolding upper surface part 63P of the scaffolding member 63 and the weight body upper surface part 60T of the weight body 60 (upper weight upper surface part 62T) are disposed in line with each other along the left and right direction. In other words, both ends of the left and right direction of the one pair of scaffolding members 63 are disposed close to the left side frame 511 and the right side frame 521 with a predetermined space. As a result, a moving passage TR (FIG. 2) is formed that allows the worker of the crane 10 to move between the one pair of side frames through the upper weight 62 and the one pair of scaffolding members 63. This allows the worker to move safely and easily. Furthermore, in the present embodiment, the moving passage TR is formed in the lower travelling body 12 by installing the scaffolding members 63 lighter than the upper weight 62 in the weight body 60. Therefore, a size and weight of the upper weight 62 are set smaller than in other structure in which the upper weight 62 is wider than the lower weight 61 and the upper weight 62 functions as the pair of scaffolding members 63. This allows the rear weight 54 to be easily assembled.

Note that the front weight 53 also produces a similar effect. Also, the scaffolding upper surface parts 63P of the scaffolding members 63 and the weight body upper surface part 60T of the weight body 60 (upper weight upper surface part 62T) do not need to be disposed in line with each other in all areas of the front and rear direction. The moving passage TR through which the worker can pass may be formed by part of the scaffolding upper surface part 63P and part of the weight body 60P. In this case, it is further preferable that there is no step larger than a size of worker's foot in the moving passage TR.

Also, with reference to FIGS. 2 and 3, in the present embodiment, coupling passages AW are formed to allow the worker to easily access the coupling parts 56 (FIG. 2) from the rear of the rear weight 54 through below the scaffolding members 63. The coupling passages AW are formed along the front and rear direction below the scaffolding members 63 between the weight right side surface 60R and the right side frame 521 and between the weight left side surface 60L and the left side frame 511. In more detail, the coupling passages AW are formed along the front and rear direction below the scaffolding members 63 between the weight right side surface 60R and the weight left side surface 60L, and the one pair of jack up devices 55. Note that the scaffolding lower surface part 63Q of the scaffolding member 63, the weight right side surface 60R, and the weight left side surface 60L define the coupling passage AW along the front and rear direction.

Moreover, in the present embodiment, in order to secure these coupling passages AW, the one pair of left and right side surfaces of the lower weight 61 (lower weight left side surface 61L and lower weight right side surface 61R) are disposed spaced apart from the one pair of side frames in the left and right direction. In other words, as shown in FIGS. 3 and 5, widths of the left and right direction of the weight body 60 and the one pair of scaffolding members 63 are set to allow the rear weight 54 and the one pair of scaffolding members 63 to have a T-shape that forms the coupling passages AW. Meanwhile, each of the lower weight left side surface 61L and the lower weight right side surface 61R of the lower weight 61 also has a function of defining one side part of each coupling passage AW. Therefore, the worker can reach the coupling parts 56 by travelling to the truck frame 50 side along the side surfaces of the lower weight 61.

Note that the worker who has reached a place between the truck frame 50 and the rear weight 54 through the coupling passage AW can insert the coupling pins P1 into the through hole 504S and the through hole 613S by stretching an arm of the worker along the left and right direction while holding the coupling pins P1 (FIG. 7). Thus, in the present embodiment, the worker can access the upper coupling part 561 and the lower coupling part 562 from the front or back of the travelling body weight through the coupling passage AW. Therefore, in a configuration in which the front weight 53 or the rear weight 54 is directly coupled to the front surface part 501 or the rear surface part 502 of the truck frame 50, respectively, a coupling operation of both parts can be easily implemented by the installation of the coupling P1 pins. Also, the one pair of jack up devices 55 does not interfere with the passage of the worker through the coupling passage AW.

Also, in the present embodiment, as shown in FIG. 2, the scaffolding members 63 include jack cutouts 63S each having a partially cutout shape so as to face the jack up device 55. This prevents the scaffolding members 63 from interfering with the jack up devices 55, and improves ease of operation of the jack up devices 55 by the worker.

Furthermore, in the present embodiment, the one pair of storage parts 615 is provided on both left and right ends of the rear surface part of the lower weight 61 (side surface of the lower weight 61 on the front side of the sheet of FIG. 3). This allows the worker to take out the coupling pins P1 from the storage parts 615 and promptly enter the coupling passage AW. Note that the storage parts 615 may be provided on the lower weight left side surface 61L and the lower weight right side surface 61R of the lower weight 61. Also in this case, the worker can take out the coupling pins P1 from the storage parts 615 while entering the coupling passage AW, and can promptly reach the coupling parts 56 through the coupling passage AW. Alternatively, the storage parts 615 may be disposed in other areas of the weight body 60 and the one pair of scaffolding members 63.

Note that a shape of the storage part 615 is preferably set such that, when the coupling pin P1 is stored in the storage part 615, part of the coupling pin P1 is exposed from the storage part 615. In this case, by disposing the storage part 615 on any of the lower weight left side surface 61L, the lower weight right side surface 61R, and the rear surface part of the lower weight 61, the worker can easily check whether the coupling pin P1 has been installed in the coupling part 56 depending on whether the storage part 615 contains the coupling pin P1.

Also, in the present embodiment, the weight body 60 can be separated into the lower weight 61 and the upper weight 62. This improves ease of transportation of the front weight 53 and the rear weight 54. Furthermore, the one pair of scaffolding members 63 is detachable from the weight body 60 (upper weight 62). As a result, in the present embodiment, it is possible to transport the scaffolding members 63 and the weight body 60 in a plurality of modes as follows. (i) a mode in which the lower weight 61, the upper weight 62, and the one pair of scaffolding members 63 are all coupled to each other; (ii) a mode in which the lower weight 61 and the upper weight 62 are coupled to each other, and the one pair of scaffolding members 63 is removed; (iii) a mode in which the one pair of scaffolding members 63 and the upper weight 62 are coupled to each other, and the lower weight 61 and the upper weight 62 are separated; and (iv) a mode in which all the lower weight 61, the upper weight 62, and the one pair of scaffolding members 63 are separated.

Also, in the present embodiment, as shown in FIGS. 2 and 3, the ladder 57 is detachable in each of the one pair of scaffolding members 63. This allows the worker to move directly from the ground onto the scaffolding members 63 and the rear weight 54 (front weight 53). In other words, access to the weight body upper surface part 60T of the rear weight 54 and the one pair of side frames 511 and 521 from the ground is better than in other weight structure in which the worker moves from the ground to part of the rear weight 54 and then to the upper surface part of the rear weight 54.

Figure 12:
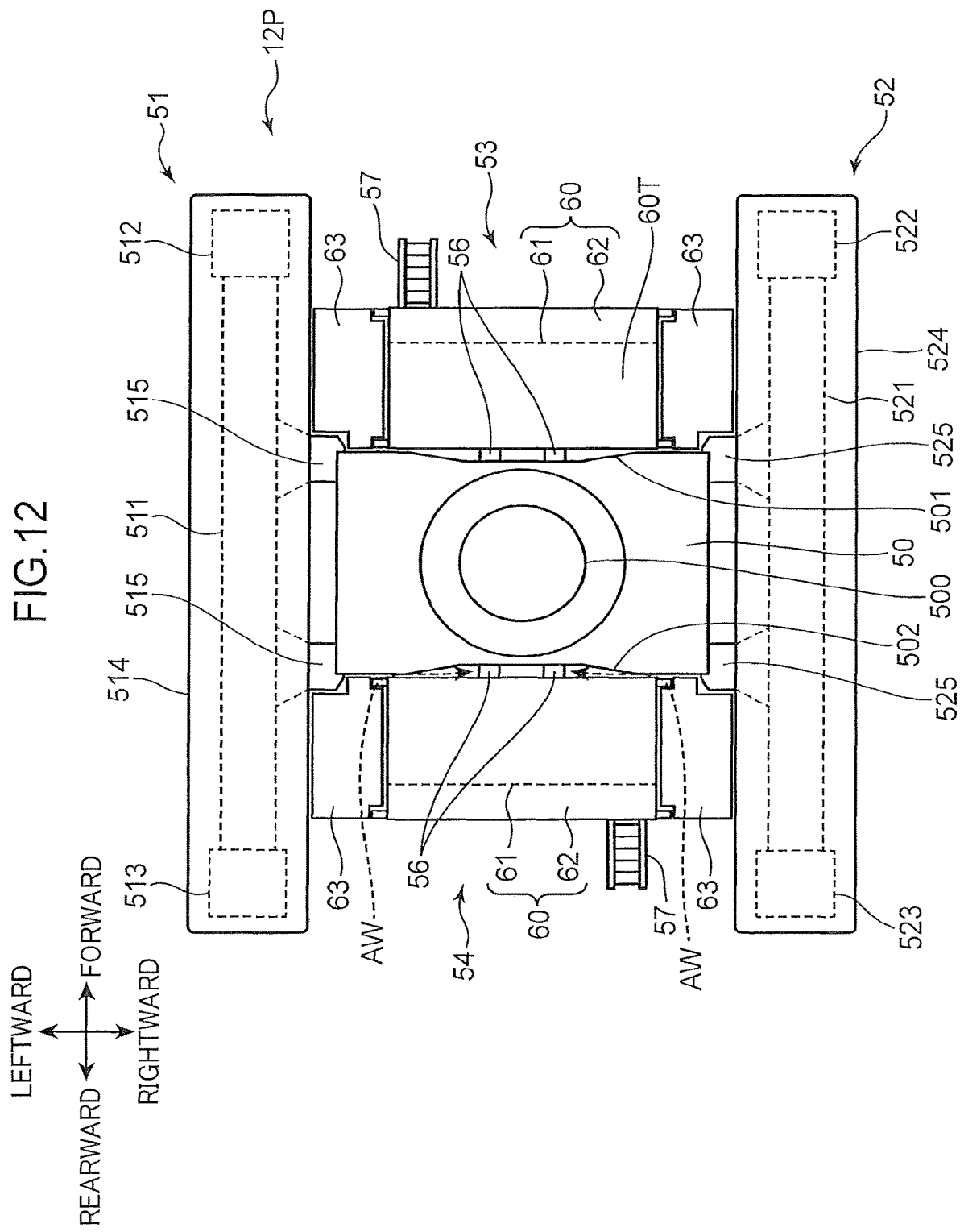
FIG. 12 is a plan view of a lower travelling body of a construction machine according to a second embodiment of the present invention.
Figure 13:
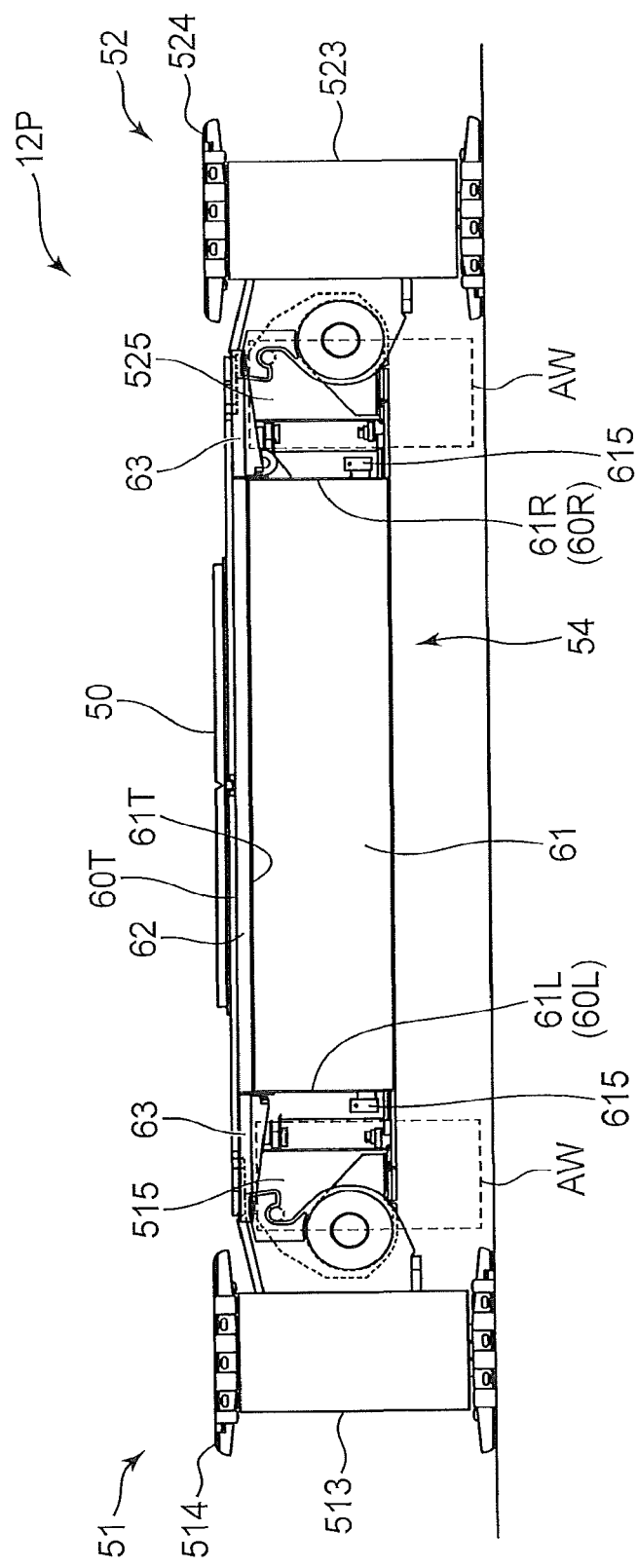
FIG. 13 is a rear view of the lower travelling body of the construction machine according to the second embodiment of the present invention.
Figure 14:
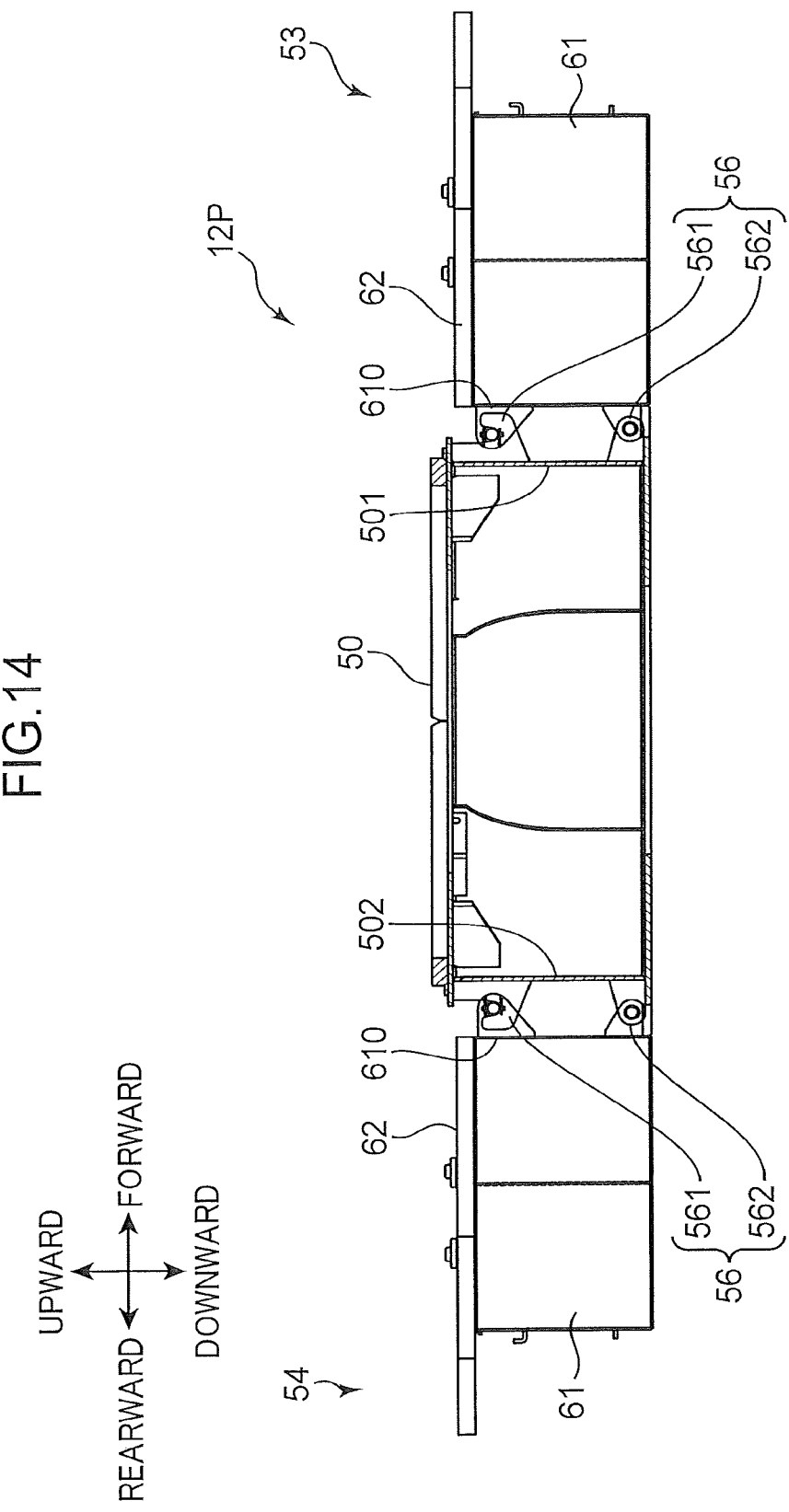
FIG. 14 is a side cross-sectional view of the lower travelling body of the construction machine according to the second embodiment of the present invention.

Hereinafter, with reference to the drawings, a second embodiment of the present invention will be described. Note that the present embodiment, which differs from the first embodiment mainly in structure of scaffolding members 63, will mainly describe the difference. Also, in the present embodiment, members having the same functions as the members according to the first embodiment are denoted with the same reference signs. FIG. 12 is a plan view of a lower travelling body 12P of a crane 10 according to the present embodiment. FIG. 13 is a rear view of the lower travelling body 12P. Meanwhile, FIG. 14 is a side cross-sectional view of the lower travelling body 12P.

The lower travelling body 12P includes a truck frame 50, a left crawler unit 51, a right crawler unit 52, a front weight 53 (travelling body weight), a rear weight 54 (travelling body weight), a plurality of coupling parts 56, and two pairs of front and rear scaffolding members 63.

One pair of the front scaffolding members 63 is installed in the front weight 53. One pair of the rear scaffolding members 63 is installed in the rear weight 54. In the present embodiment, the two scaffolding members 63 are installed in each of the front weight 53 and the rear weight 54.

Figure 15:
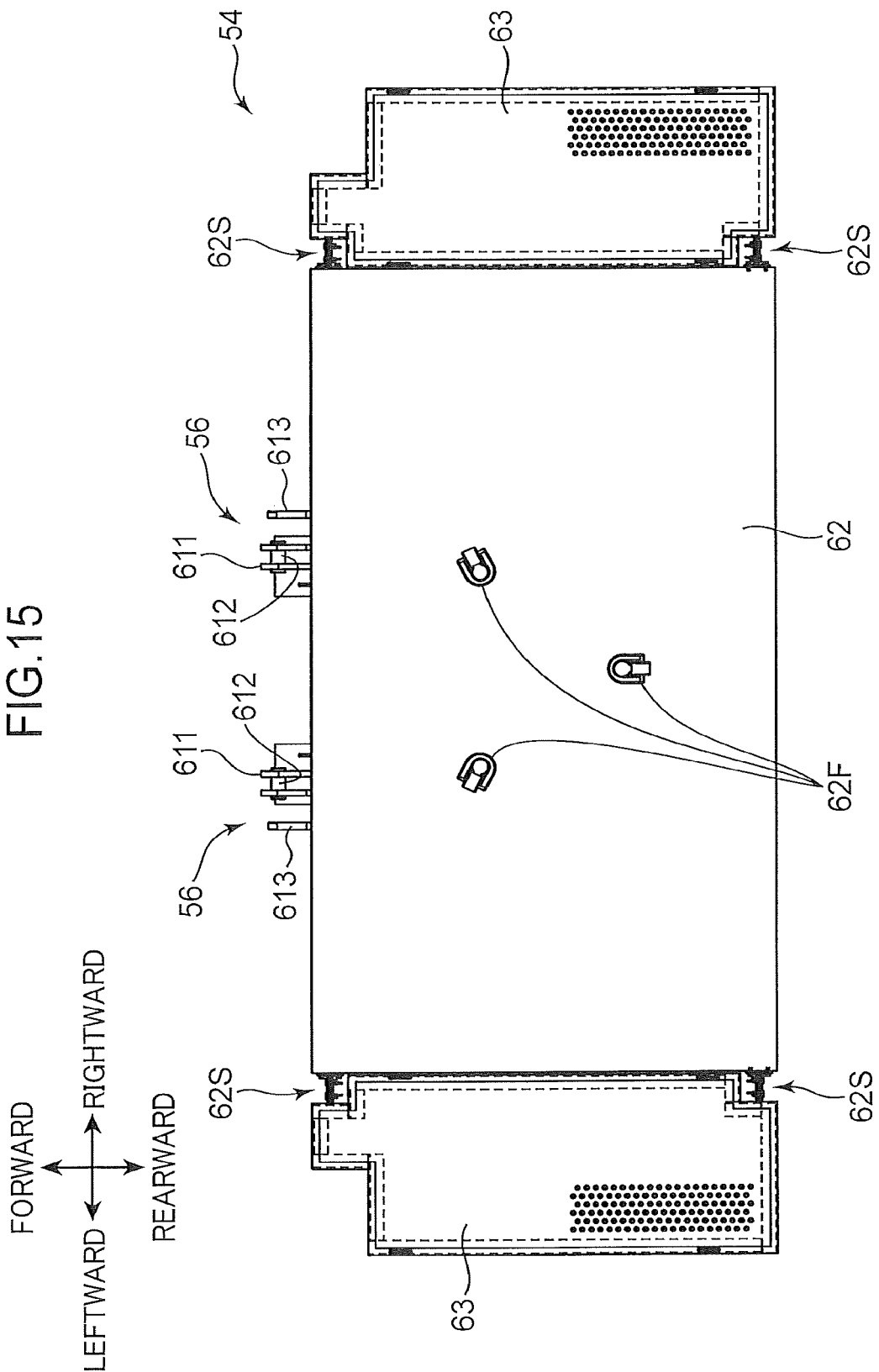
FIG. 15 is a plan view of a travelling body weight and scaffolding members according to the second embodiment of the present invention.
Figure 16:
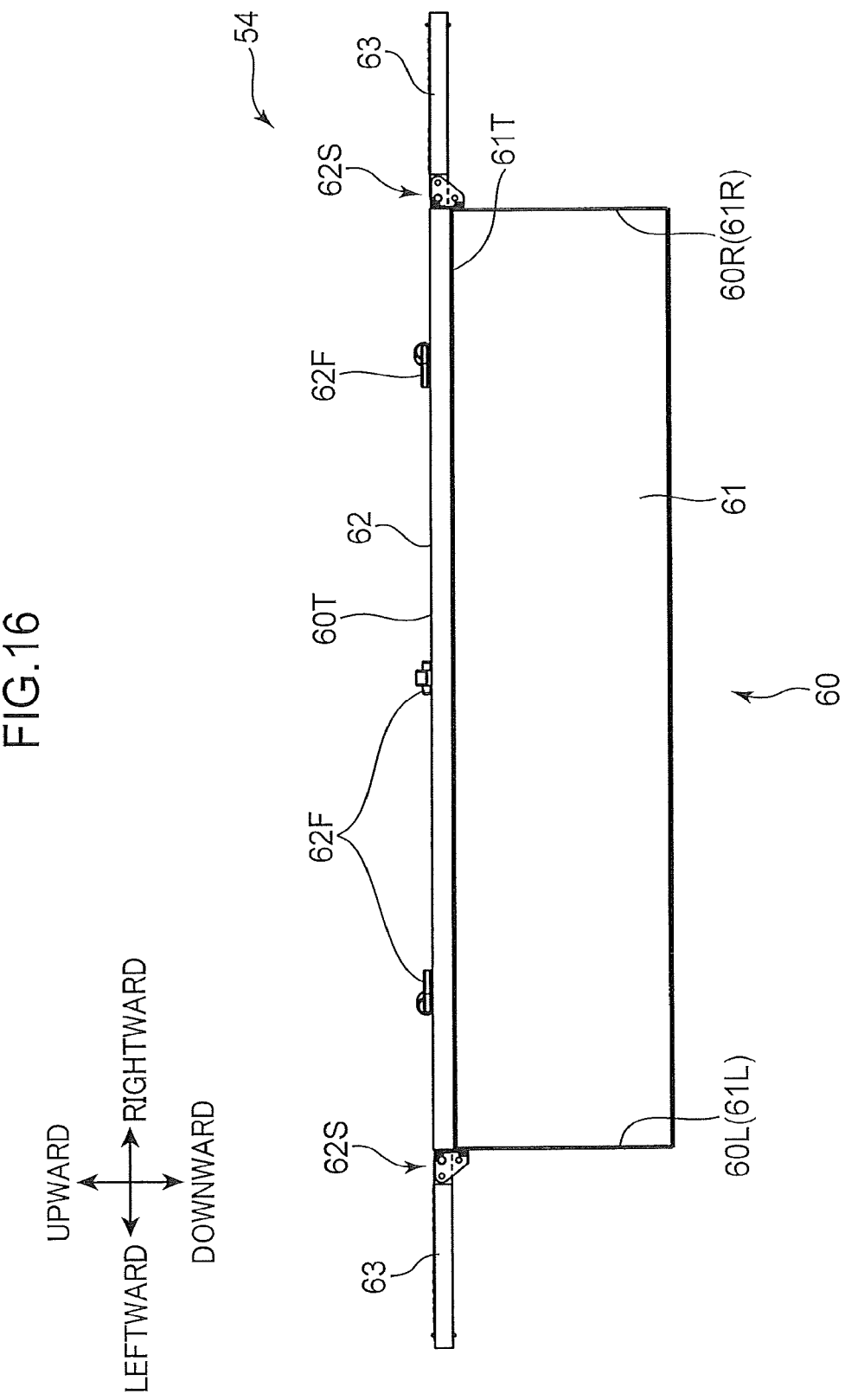
FIG. 16 is a rear view of the travelling body weight and the scaffolding members according to the second embodiment of the present invention, and is a rear view with the scaffolding members being opened.

In the present embodiment, structure and coupling structure to the truck frame 50 are the same between the front weight 53 and the rear weight 54. Therefore, the following describes the structure of the rear weight 54 and the coupling structure of the rear weight 54 to the truck frame 50 as an example. FIG. 15 is a plan view of the rear weight 54 and the one pair of scaffolding members 63 according to the present embodiment. FIG. 16 is a rear view of the rear weight 54 and the one pair of scaffolding members 63, and is a rear view with the one pair of scaffolding members 63 being opened (projecting posture).

The rear weight 54 includes a weight body 60 and a ladder 57 (FIG. 12).

The weight body 60 is a heavy object having a generally rectangular shape. The weight body 60 includes a weight upper surface part 60T facing upward and one pair of weight side surfaces (weight right side surface 60R and weight left side surface 60L) (FIG. 13). The weight upper surface part 60T is an upper surface part of the weight body 60. The weight right side surface 60R and the weight left side surface 60L are right and left side surfaces of the weight body 60, respectively.

Also, the weight body 60 includes the lower weight 61 and the upper weight 62.

In addition, in the present embodiment, one pair of left and right storage parts 615 (FIG. 13) is disposed in lower ends of a lower weight left side surface 61L and a lower weight right side surface 61R, respectively. Each storage part 615 has a cylindrical shape, an upper end of the storage part 615 is opened, and a lower end of the storage part 615 is blocked by a bottom. The storage part 615 can store a coupling pin P1 that couples the lower weight 61 to the truck frame 50 (see FIGS. 20 and 21). Therefore, in a state where the rear weight 54 is not coupled to the truck frame 50, the loss of the coupling pin P1 is prevented.

The one pair of scaffolding members 63 installed in the rear weight 54 is supported by the weight right side surface 60R and the weight left side surface 60L of the weight body 60. In more detail, the one pair of scaffolding members 63 is supported by side surfaces of both ends of a left and right direction of the upper weight 62. Each scaffolding member 63 includes an upper surface part that can face upward (scaffolding upper surface part) and a lower surface part that can face downward (scaffolding back surface part). Also in the present embodiment, the scaffolding member 63 mainly includes a metal plate, and a plurality of holes is opened in the scaffolding member 63. The holes enable weight reduction of the scaffolding member 63 and suppress slippage when a worker moves because mud or the like attached to worker's shoes falls from the holes of the scaffolding member 63. Note that as one example, in the present embodiment, one scaffolding member 63 weighs 100 kg, and includes a metal member lighter than the upper weight 62.

Figure 17:
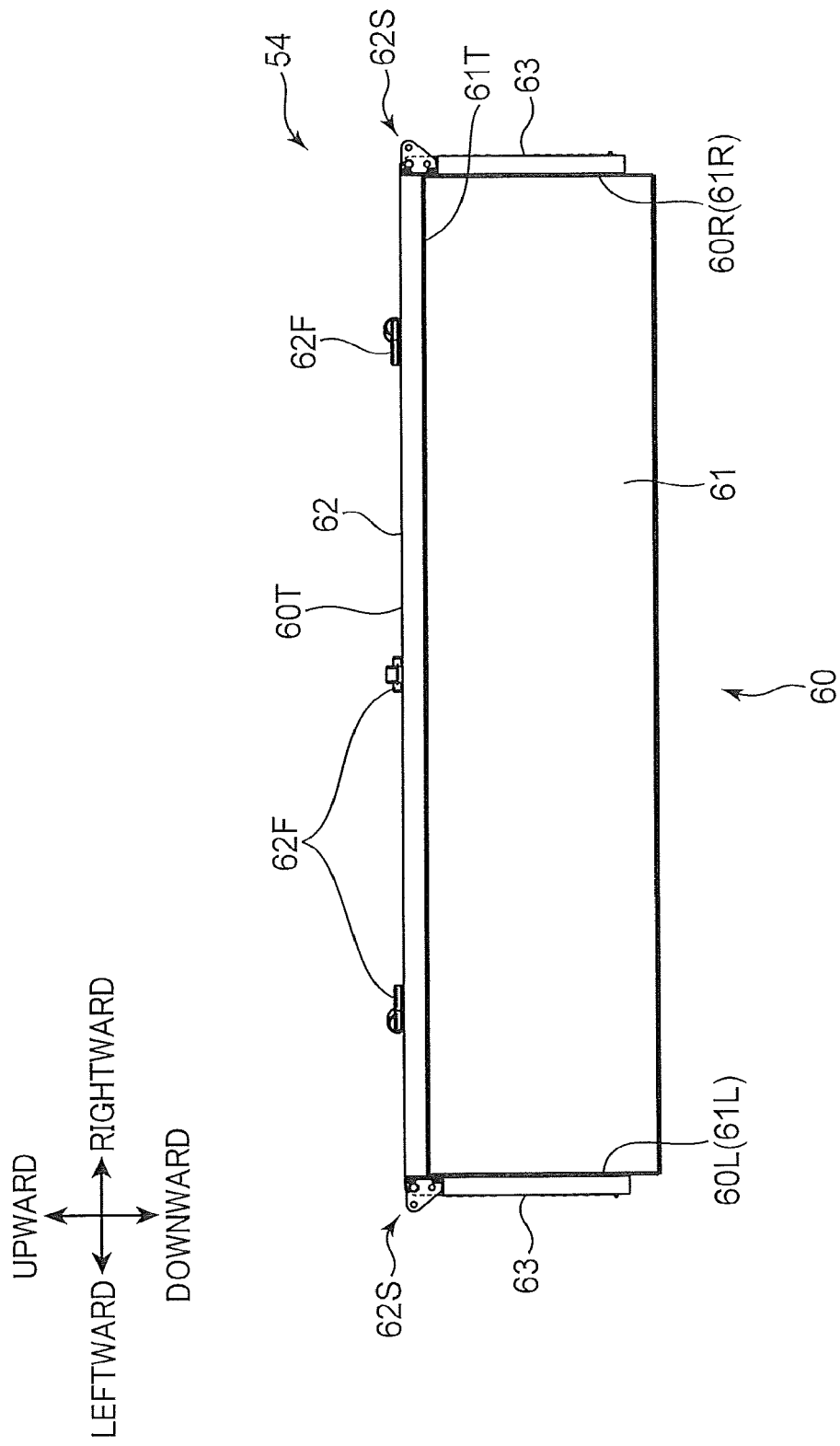
FIG. 17 is a rear view of the travelling body weight and the scaffolding members according to the second embodiment of the present invention, and is a rear view with the scaffolding members being closed.
Figure 18:
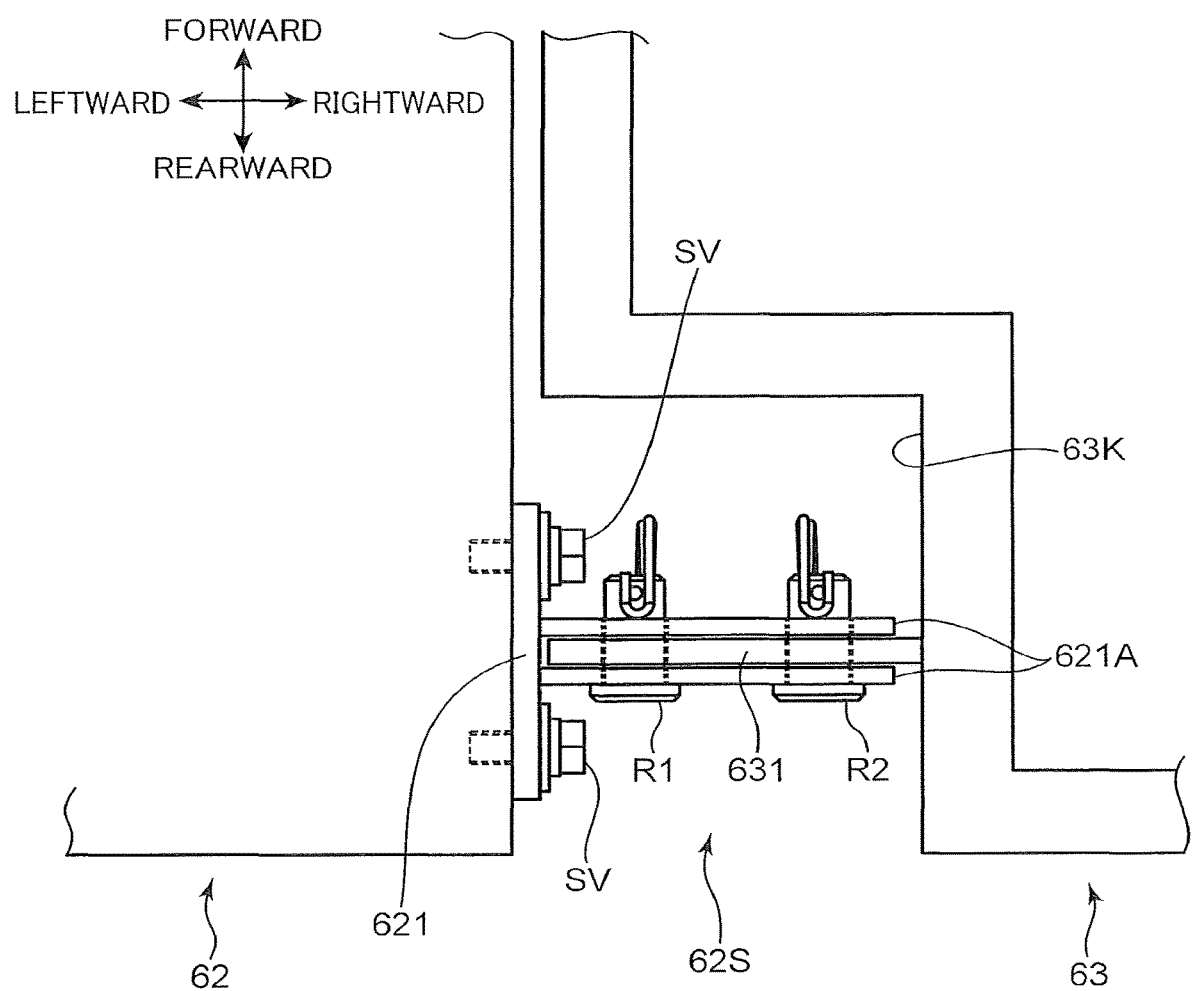
FIG. 18 is an enlarged plan view in which part of FIG. 15 is enlarged.
Figure 19:
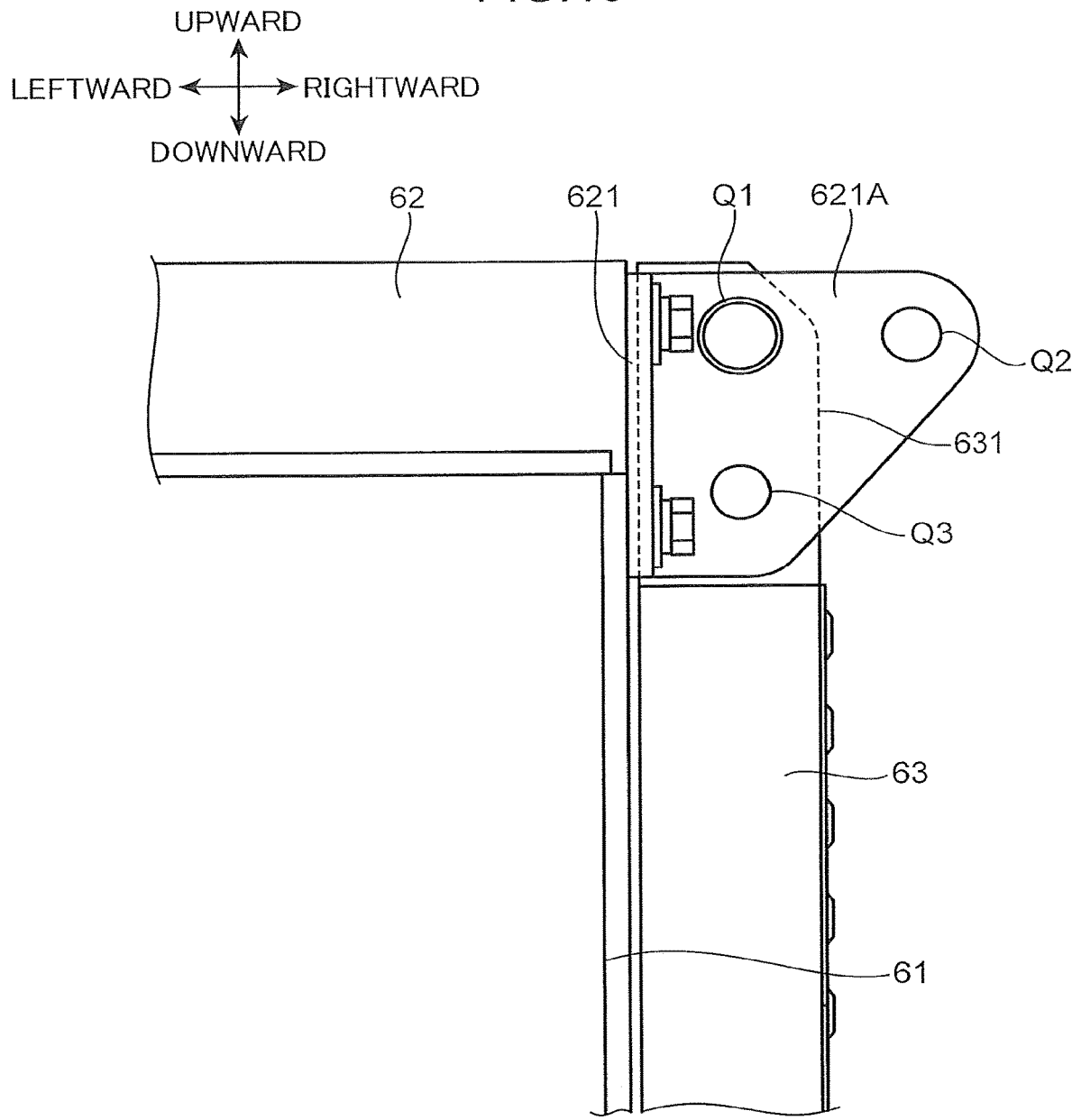
FIG. 19 is an enlarged rear view in which part of FIG. 17 is enlarged.

In the present embodiment, the scaffolding members 63 can change a posture between the projecting posture and an accommodation posture. FIG. 17 is a rear view of the rear weight 54 and the scaffolding members 63 according to the present embodiment, and is a rear view with the scaffolding members 63 being closed (accommodation posture). FIG. 18 is an enlarged plan view in which part of FIG. 15 is enlarged. FIG. 19 is an enlarged rear view in which part of FIG. 17 is enlarged. As shown in FIG. 15, the one pair of scaffolding members 63 is supported by the upper weight 62 at two front and rear support portions 62S.

As shown in FIGS. 15 and 18, the support portions 62S are disposed to face cutouts 63K in which corner portions of the scaffolding members 63 are partially cut out.

The upper weight 62 further includes support brackets 621 (support members) (FIGS. 18 and 19). Each support bracket 621 is fixed to a side surface of the upper weight 62 (upper ends of the weight right side surface 60R and the weight left side surface 60L) with a plurality of fastening bolts SV. The support bracket 621 includes two support plates 621A projecting toward the scaffolding member 63. The two support plates 621A are disposed spaced apart from each other in a front and rear direction. As shown in FIG. 19, when viewed from the rear, the support plate 621A is a plate having a generally triangular shape. In each support plate 621A, three holes Q1, Q2, and Q3 are opened. Note that a distance between the holes Q1 and Q2 is set equal to a distance between the holes Q1 and Q3. The hole Q1 constitutes a fulcrum part of the present invention.

Meanwhile, the scaffolding member 63 includes a supported plate 631 projecting toward the upper weight 62 from an end surface of the cutout 63K. The supported plate 631 is inserted between the two support plates 621A (FIG. 18). In the supported plate 631, two holes (not shown) are opened to face the holes Q1 and Q2 of the support plate 621A. In a state where the scaffolding member 63 is in the projecting posture as shown in FIGS. 15 and 16, as shown in FIG. 18, a fixing pin R1 is inserted and fixed in a hole opened on a tip side of the supported plate 631 and the holes Q1 of the one pair of support plates 621A. Furthermore, a fixing pin R2 is inserted and fixed in a hole opened on a proximal end side of the supported plate 631 and the holes Q2 of the one pair of support plates 621A. As a result, the scaffolding member 63 is supported by the upper weight 62 in the projecting posture.

Meanwhile, when the fixing pin R2 is detached from the hole opened on the proximal end side of the supported plate 631 and the holes Q2 of the one pair of support plates 621A and the tip side of the scaffolding member 63 is pivoted downward, the scaffolding member 63 adopts the accommodation posture shown in FIG. 17. At this time, the fixing pin R1 inserted into the hole Q1 of FIG. 19 (FIG. 18) serves as a fulcrum (rotation center) for pivoting of the scaffolding member 63. When the scaffolding member 63 adopts the accommodation posture, the fixing pin R2 is inserted and fixed in the hole opened on the proximal end side of the supported plate 631 and the holes Q3 of the one pair of support plates 621A (FIG. 19). As a result, the scaffolding member 63 is fixed and supported by the upper weight 62 in the accommodation posture.

In the projecting posture shown in FIGS. 15 and 16, the posture is adopted in which the upper surface part of the scaffolding member 63 faces upward, and the one pair of scaffolding members 63 extends to project on right side frame 521 and left side frame 511 sides from the weight right side surface 60R and the weight left side surface 60L of the weight body 60. At this time, both ends of the left and right direction of the one pair of scaffolding members 63 are disposed close to the left side frame 511 and the right side frame 521 with a predetermined space. Furthermore, the upper surface parts of the one pair of scaffolding members 63 and the weight upper surface part 60T of the weight body 60 are disposed in line with each other along the left and right direction. As a result, the one pair of scaffolding members 63 forms a moving passage that enables the worker to move between the one pair of side frames (left side frame 511 and right side frame 521) together with the weight upper surface part 60T.

Meanwhile, in the accommodation posture shown in FIG. 17, the one pair of scaffolding members 63 is spaced more inside of the left and right direction from the one pair of side frames than in the projecting posture. Furthermore, the lower surface parts of the one pair of scaffolding members 63 (scaffolding back surface parts) in the projecting posture are disposed to overlap with the weight right side surface 60R and the weight left side surface 60L in the accommodation posture (FIG. 17).

The ladder 57 (FIG. 12) can be installed in the upper surface part of the upper weight 62 of the rear weight 54, and enables the worker to move between the ground and the upper surface part of the rear weight 54.

Figure 20:
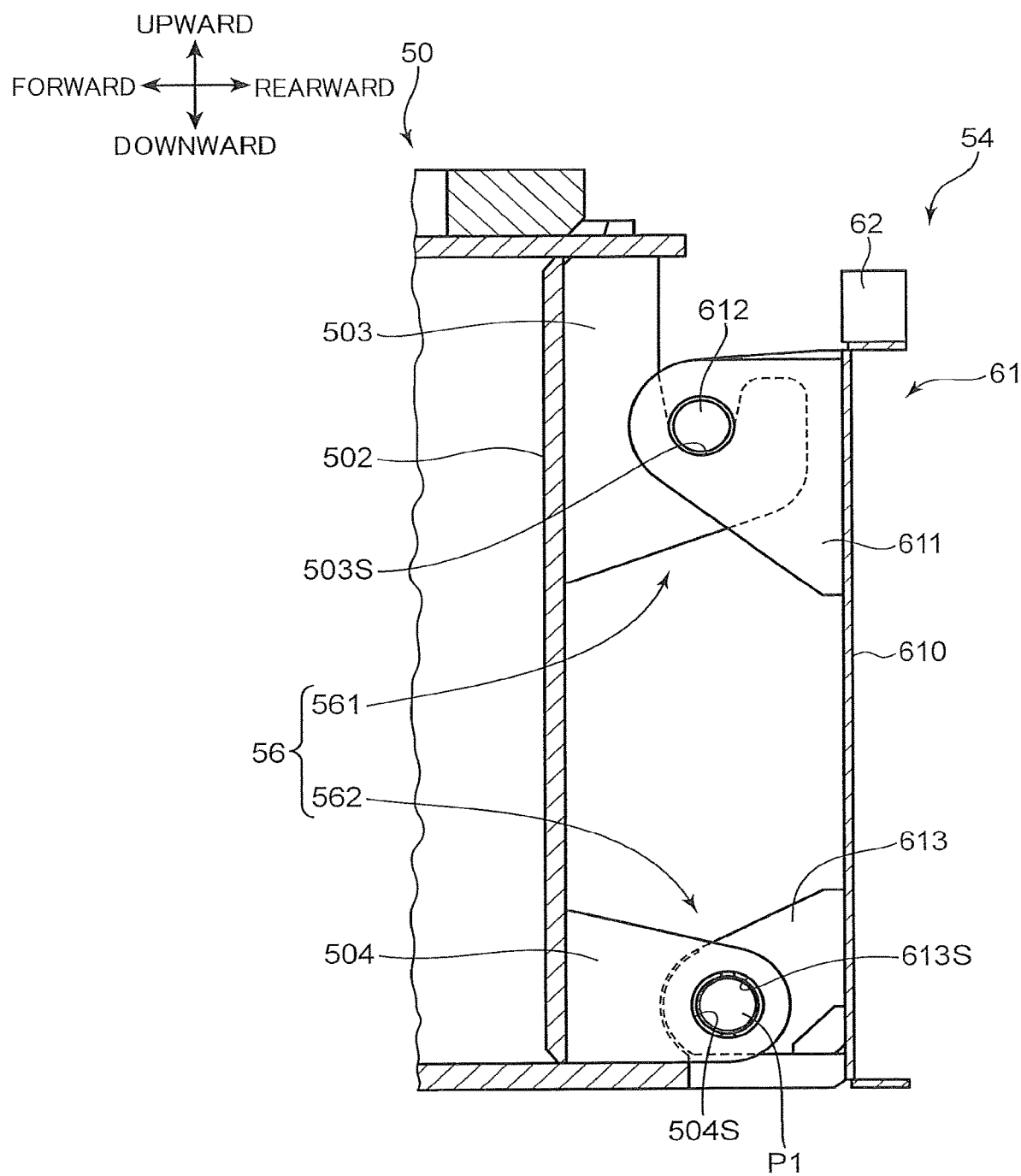
FIG. 20 is an enlarged cross-sectional view in which part of the lower travelling body of FIG. 14 is enlarged.

FIG. 20 is an enlarged cross-sectional view in which part of the lower travelling body 12 of FIG. 14 is enlarged. The truck frame 50 further includes, provided on a rear surface part 502, one pair of upper frame coupling parts 503 (frame side coupling parts) (FIG. 20) and one pair of lower frame coupling parts 504 (frame side coupling parts) (FIG. 20). Note that a front surface part 501 of the truck frame 50 is also provided with similar coupling parts (FIG. 14). These coupling parts constitute the coupling parts 56 (FIG. 12) of the present invention as in the first embodiment.

Also in the present embodiment, when the rear weight 54 is coupled to the truck frame 50, as described above, the moving passage is formed that allows the worker to move between the pair of side frames through the upper surface parts of the one pair of scaffolding members 63 and the upper surface part of the upper weight 62. This allows the worker to easily move between the one pair of side frames through the upper surface parts of the scaffolding members 63 and the upper weight 62. Furthermore, in the present embodiment, since the upper surface parts of the one pair of scaffolding members 63 and the upper weights 62 extend in line with each other along the left and right direction, the movement of the worker is implemented safely and easily. Note that the front weight 53 also produces a similar effect.

Also, in the present embodiment, the scaffolding members 63 of the front weight 53 and the rear weight 54 can change the posture between the projecting posture in which the moving passage is formed and the accommodation posture in which an amount of projecting on each side frame side is smaller than in the projecting posture. Therefore, the front weight 53 and the rear weight 54 can be transported with the scaffolding members 63 in the accommodation posture being installed in the weight body 60 of each weight. Therefore, as compared with a case of separately transporting the scaffolding members 63 and each weight, ease of assembly of the front weight 53 and the rear weight 54 at a work site after the transportation can be improved. Also, as compared with a ease where the scaffolding members in the projecting posture are installed in the travelling body weight, the space occupied by the front weight 53, the rear weight 54, and the scaffolding members 63 on a platform of a transport vehicle is reduced. Therefore, mixed transportation of the weights with other members becomes easy, and ease of transportation of the weights can be improved.

Furthermore, in the present embodiment, the lower surface parts of the one pair of scaffolding members 63 (scaffolding back surface parts) in the projecting posture are disposed to overlap with the weight right side surface 60R and the weight left side surface 60L in the accommodation posture (FIG. 17). Therefore, the space occupied by the scaffolding members 63 installed in the front weight 53 and the rear weight 54 on a platform of a transport vehicle can be reduced. In addition, the posture change of the scaffolding members 63 can be easily implemented by a pivoting operation of the support bracket 621 of the support portion 62S around the hole Q1.

Moreover, with reference to FIGS. 12 and 13, also in the present embodiment, coupling passages AW (FIG. 13) are formed to allow the worker to easily access the coupling parts 56 (FIG. 12) from the rear of the rear weight 54. The coupling passages AW are formed below the scaffolding member 63 along the front and rear direction between the weight right side surface 60R and the left side frame 511, and between the weight left side surface 60L and the right side frame 521. Moreover, in the present embodiment, in order to secure these coupling passages AW, the one pair of left and right side surfaces of the lower weight 61 (lower weight left side surface 61L and lower weight right side surface 61R) are disposed spaced apart from the one pair of side frames in the left and right direction. In other words, as shown in FIGS. 13 and 16, widths of the left and right direction of the lower weight 61 and the one pair of scaffolding members 63 are set to allow the rear weight 54 to have a T-shape that forms the coupling passages AW. Meanwhile, each of the lower weight left side surface 61L and the lower weight right side surface 61R of the lower weight 61 also has a function of defining one side part of each coupling passage AW. Therefore, the worker can reach the coupling parts 56 by travelling to the truck frame 50 side along the side surfaces of the lower weight 61.

Furthermore, in the present embodiment, the storage parts 615 are provided on the lower weight left side surface 61L and the lower weight right side surface 61R. This allows the worker to take out the coupling pins P1 from the storage parts 615 while entering the coupling passages AW. Note that as in a third embodiment to be described later, the storage parts 615 may be provided on the rear surface part of the lower weight 61 (side surface on the front side of the sheet of FIG. 13). Also in this case, the worker can take out the coupling pins P1 from the storage parts 615, and can promptly reach the coupling parts 56 through the coupling passages AW.

Figure 21:
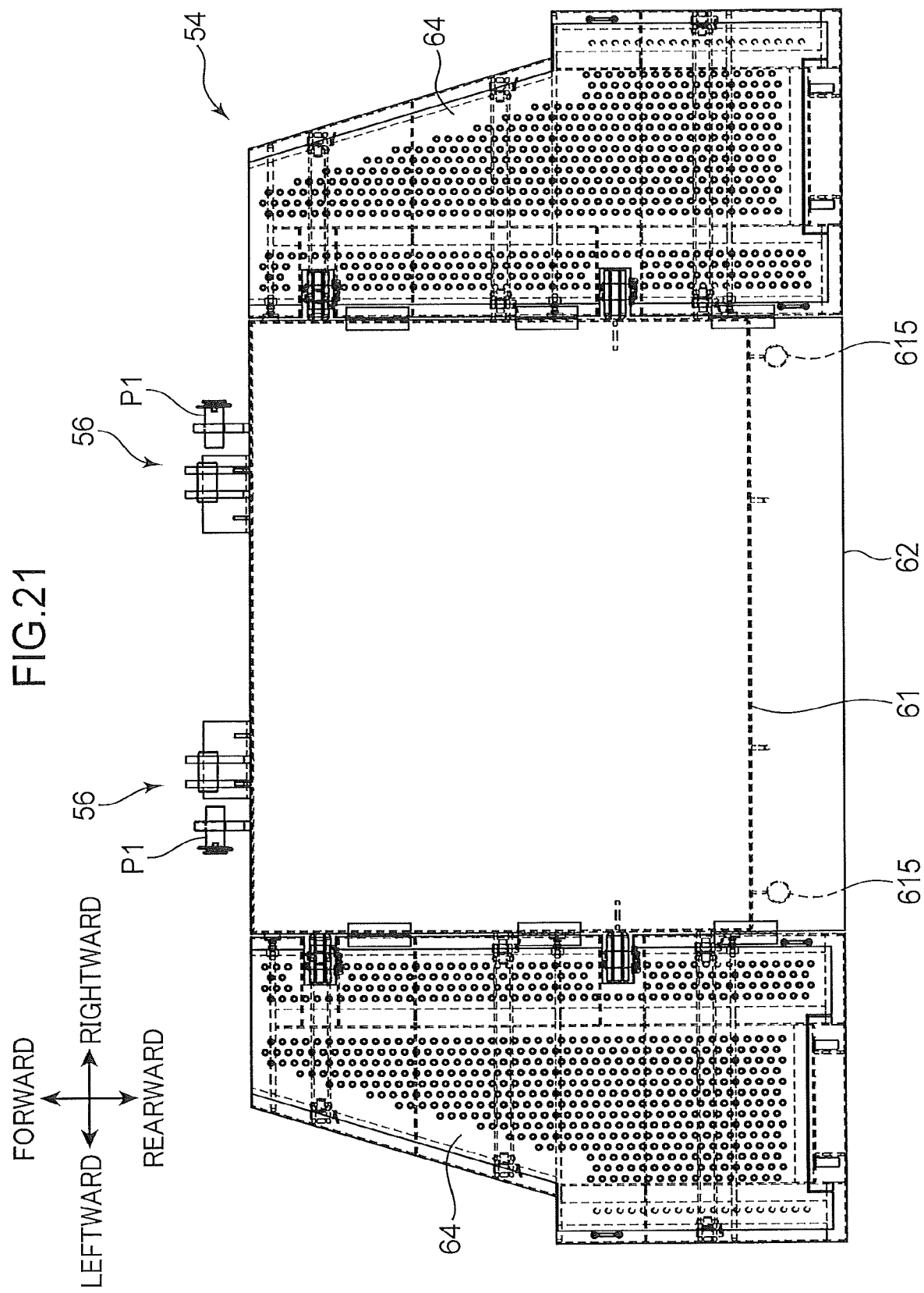
FIG. 21 is a plan view of a travelling body weight and scaffolding members according to a third embodiment of the present invention, and is a plan view with the scaffolding members being opened.
Figure 22:
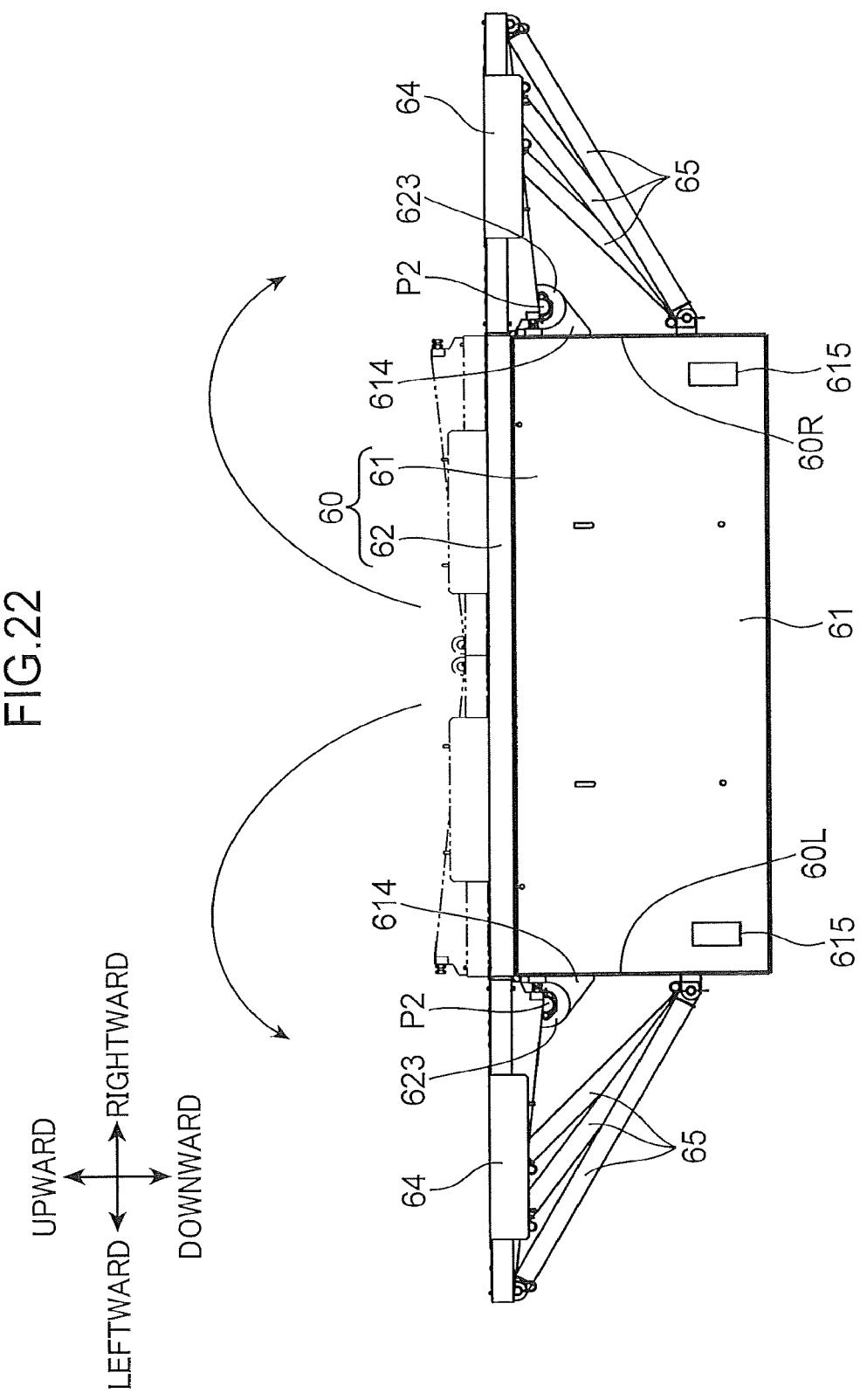
FIG. 22 is a rear view of the travelling body weight and the scaffolding members according to the third embodiment of the present invention, and is a rear view with the scaffolding members being opened.
Figure 23:
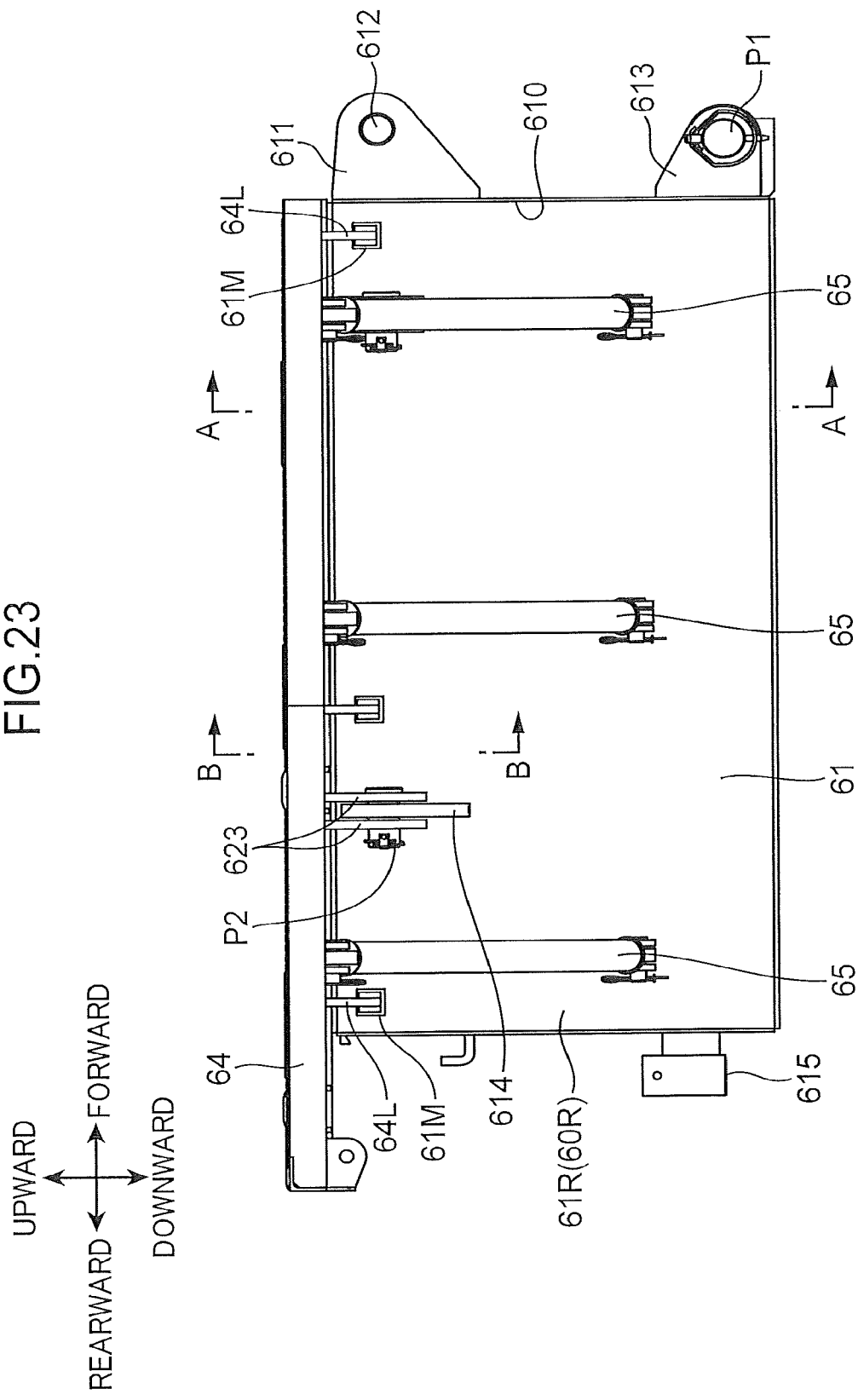
FIG. 23 is a side view of the travelling body weight and the scaffolding member of FIG. 22.
Figure 24:
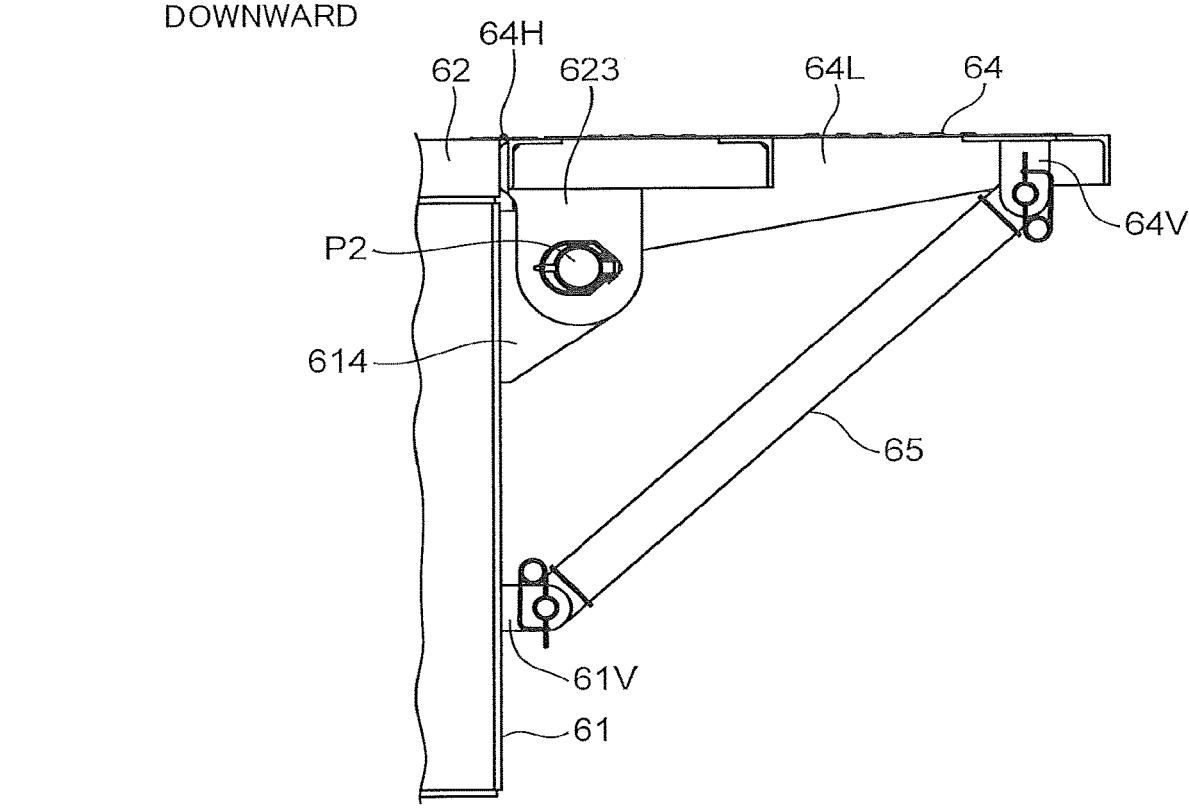
FIG. 24 is a cross-sectional view taken along line A-A of FIG. 23.
Figure 25:
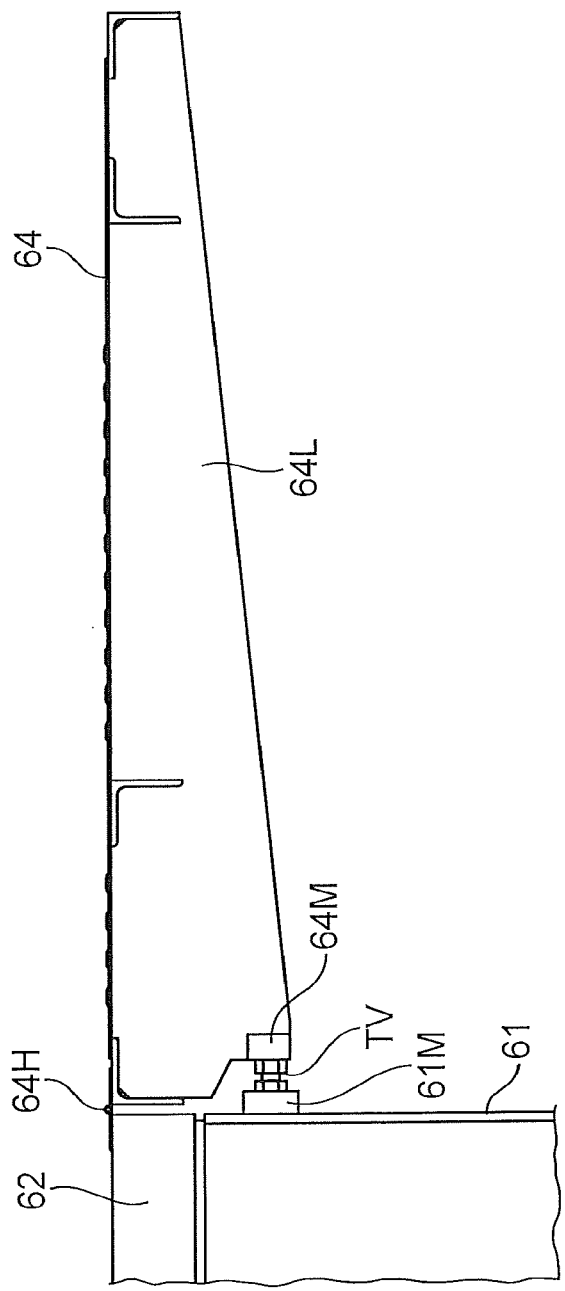
FIG. 25 is a cross-sectional view taken along line B-B of FIG. 23.
Figure 26:
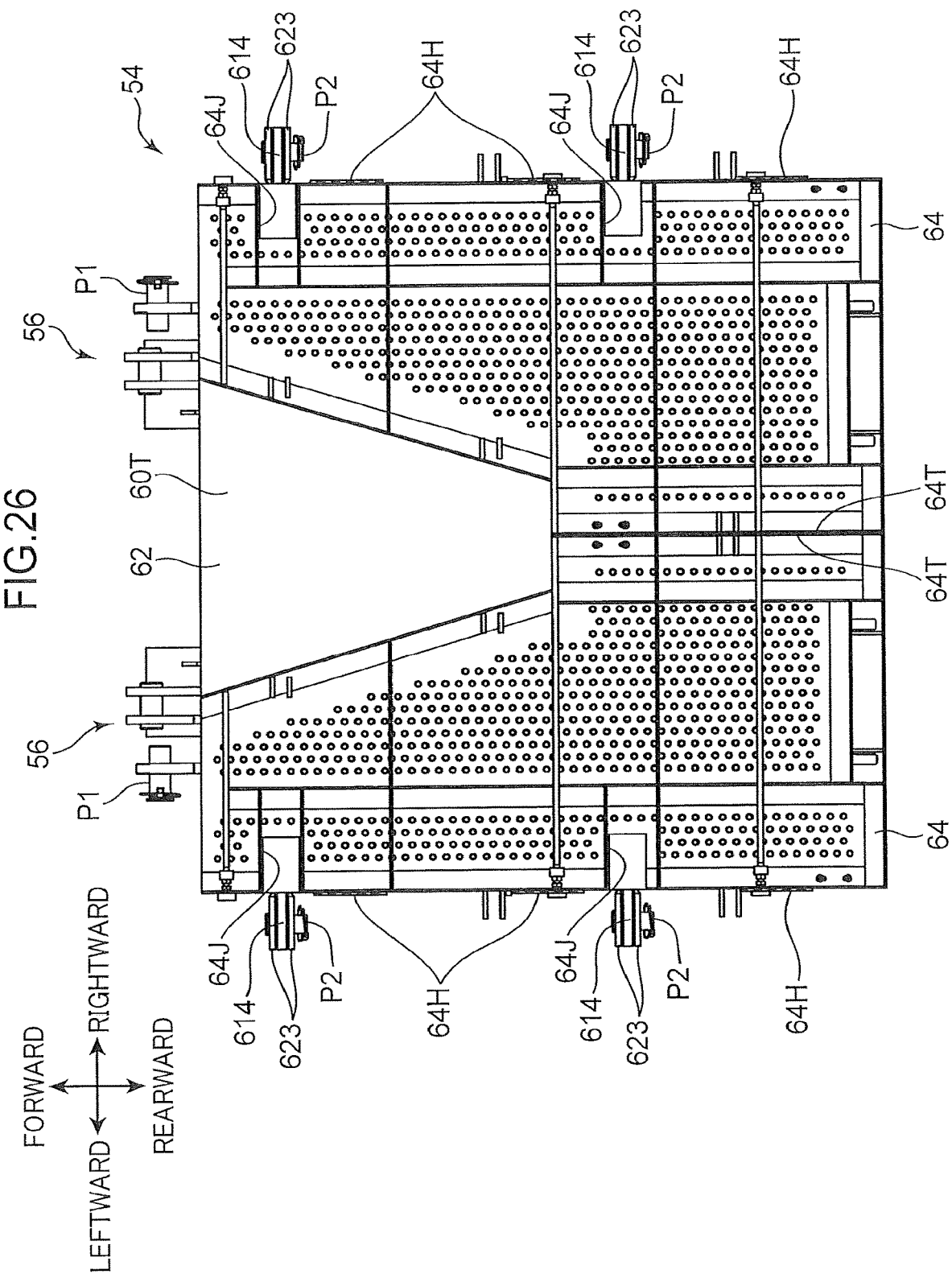
FIG. 26 is a plan view of the travelling body weight and the scaffolding members according to the third embodiment of the present invention, and is a plan view with the scaffolding members being closed.
Figure 27:
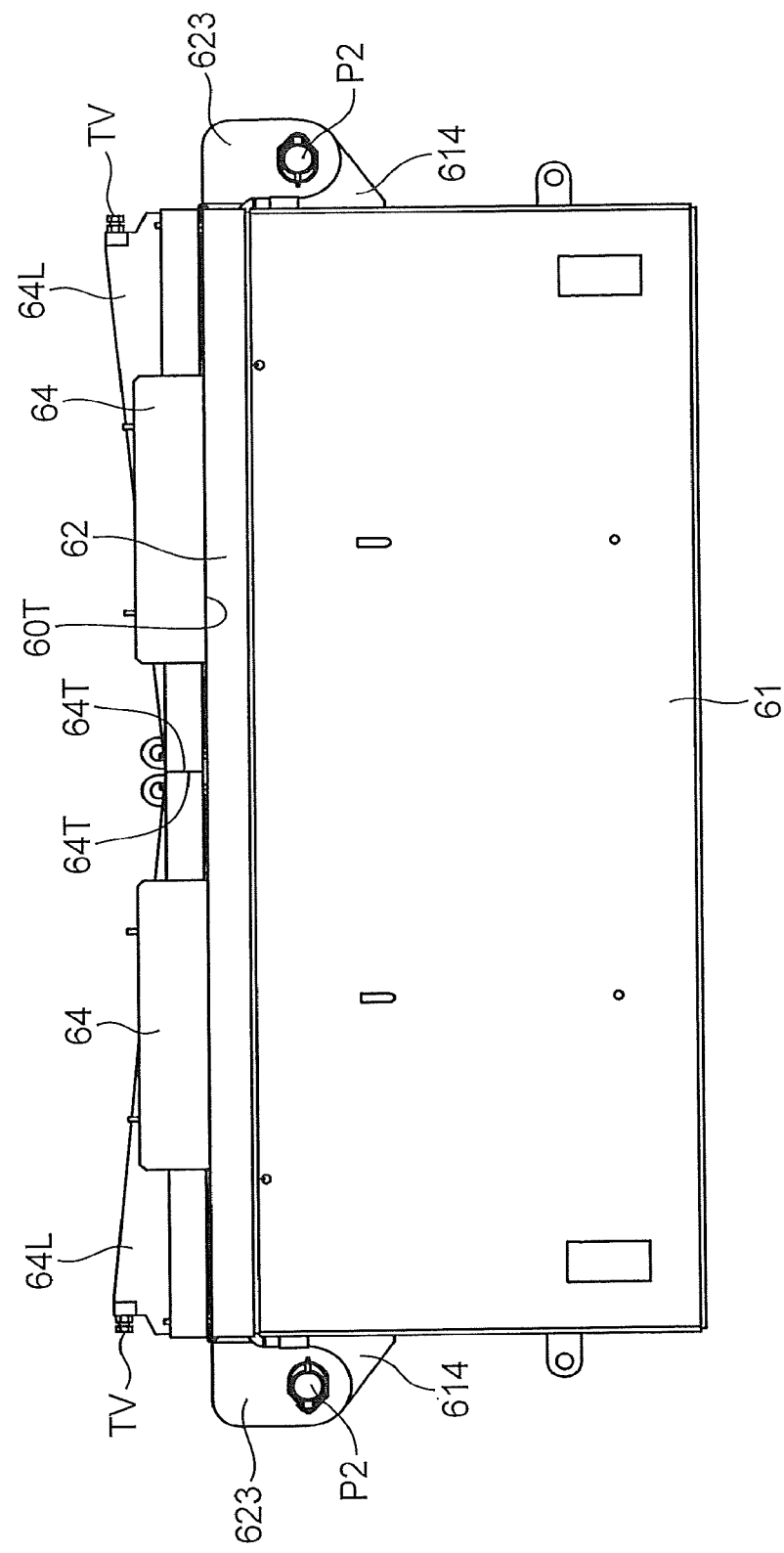
FIG. 27 is a rear view of the travelling body weight and the scaffolding members according to the third embodiment of the present invention, and is a rear view with the scaffolding members being closed.
Figure 28:
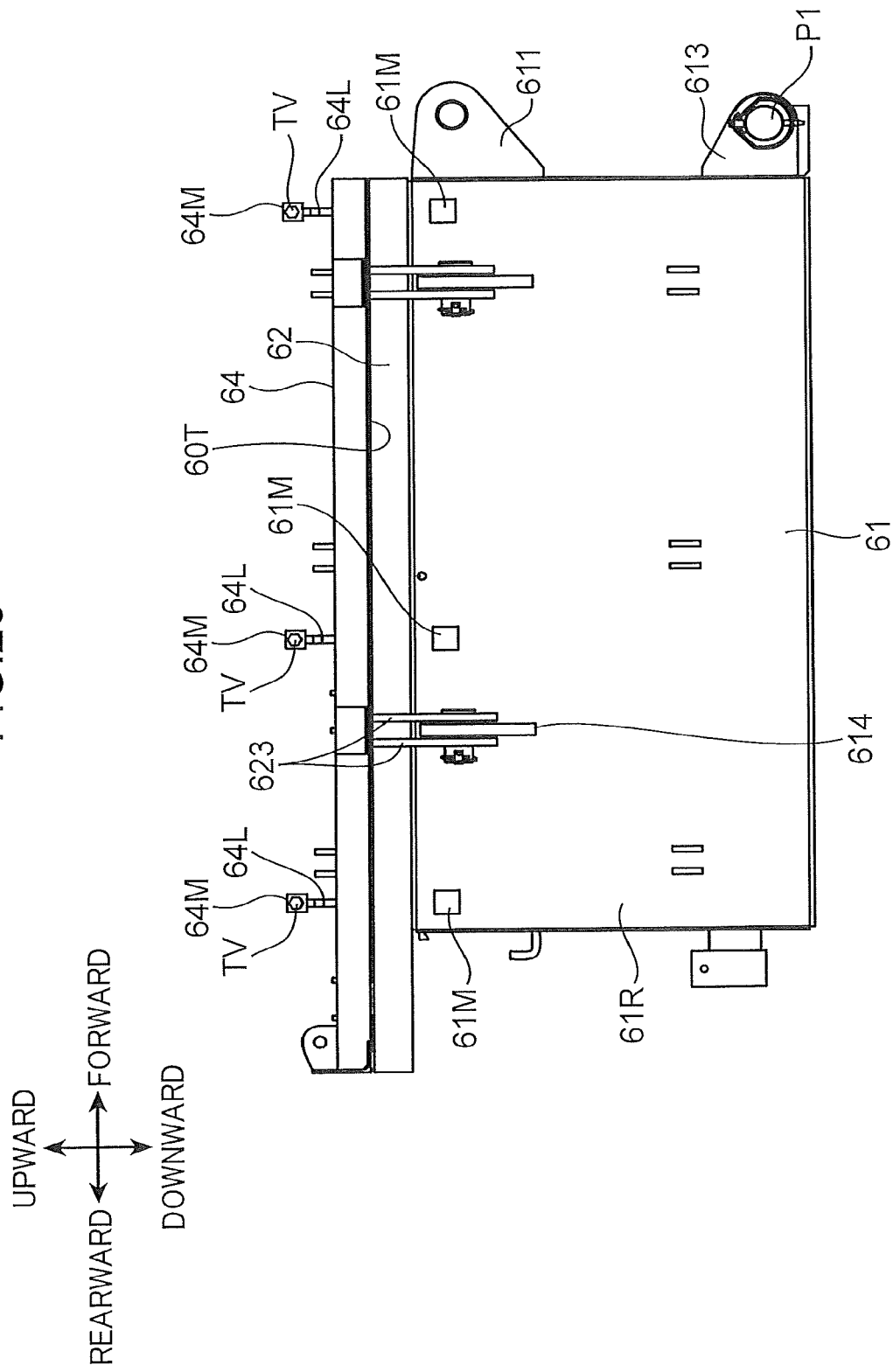
FIG. 28 is a side view of the travelling body weight and the scaffolding member of FIG. 27.

Next, a construction machine according to the third embodiment of the present invention will be described. Note that the present embodiment, which differs from the second embodiment mainly in a configuration of a rear weight 54 (front weight 53), will mainly describe the difference. Also, in each drawing, members having functions and structure similar to members of the second embodiment are denoted with the same reference signs as in FIGS. 12 to 20. FIG. 21 is a plan view of the rear weight 54 and one pair of scaffolding members 64 according to the present embodiment, and is a plan view with the one pair of scaffolding members 64 being opened. FIG. 22 is a rear view of the rear weight 54 and the one pair of scaffolding members 64, and is a rear view with the scaffolding members 64 being opened. FIG. 23 is a side view of the rear weight 54 and the one pair of scaffolding members 64 of FIG. 22. In addition, FIG. 24 is a cross-sectional view taken along line A-A of FIG. 23. FIG. 25 is a cross-sectional view taken along line B-B of FIG. 23. Furthermore, FIG. 26 is a rear view of the rear weight 54 and the one pair of scaffolding members 64, and is a plan view with the scaffolding members 64 being closed. FIG. 27 is a rear view of the rear weight 54 and the one pair of scaffolding members 64, and is a rear view with the scaffolding members 64 being closed. FIG. 28 is a side view of the rear weight 54 and the one pair of scaffolding members 64 of FIG. 27.

As shown in FIG. 21, each of the one pair of scaffolding members 64 according to the present embodiment has a generally trapezoidal shape in plan view. Note that, as shown in FIG. 21, in the present embodiment, storage parts 615 described above are disposed at both ends of a rear surface part of an upper weight 62. In the present embodiment, a lower travelling body 12 includes the rear weight 54 and the one pair of scaffolding members 64. The rear weight 54 includes a weight body 60 and a plurality of strut members 65 (FIG. 22). The weight body 60 includes a lower weight 61 and the upper weight 62.

With reference to FIGS. 22 to 24, the lower weight 61 includes a plurality of lower weight connection plates 614. Meanwhile, the upper weight 62 includes a plurality of upper weight connection plates 623. The plurality of lower weight connection plates 614 (FIG. 22) is disposed to project from upper ends of a lower weight left side surface 61L and a lower weight right side surface 61R along a left and right direction. Note that although not shown in FIG. 23, as shown in FIG. 26, in each of the lower weight left side surface 61L and the lower weight right side surface 61R, the plurality of lower weight connection plates 614 is disposed spaced apart from each other in the front and rear direction. Each lower weight connection plate 614 is used to couple the lower weight 61 to the upper weight 62. In the lower weight connection plate 614, a through hole (not shown) is opened along the front and rear direction.

The plurality of upper weight connection plates 623 is disposed to project downward from side surface parts of the upper weight 62. Note that as shown in FIG. 26, on each of the right side and the left side of the upper weight 62, the plurality of upper weight connection plates 623 is disposed spaced apart from each other in the front and rear direction. Also, two upper weight connection plates 623 are disposed at positions sandwiching each lower weight connection plate 614 of the lower weight 61 in the front and rear direction. The upper weight connection plates 623 are used to couple the lower weight 61 to the upper weight 62. In each upper weight connection plate 623, a through hole (not shown) is opened along the front and rear direction. Coupling pins P2 (FIGS. 22 and 23) are sequentially inserted into the through hole of the lower weight connection plates 614 of the lower weight 61 and the through hole of the upper weight connection plates 623 of the upper weight 62, whereby the lower weight 61 and the upper weight 62 are coupled to each other on both left and right sides of the rear weight 54. Note that as shown in FIG. 22, the upper weight 62 can be easily disposed at an installation position with respect to the lower weight 61 because the left and right upper weight connection plates 623 are disposed at positions sandwiching the lower weight 61.

With reference to FIGS. 25 and 26, the weight body 60 includes a plurality of hinges 64H (support members). The plurality of hinges 64H is disposed spaced apart from each other in the front and rear direction on both left and right ends of an upper surface part of the upper weight 62. The plurality of hinges 64H pivotably supports the one pair of scaffolding members 64. That is, each hinge 64H includes a fulcrum part of the present invention. The scaffolding member 64 is pivoted around the hinge 64H, whereby the scaffolding member 64 can change a posture between a projecting posture and an accommodation posture (see arrows of FIG. 22).

Note that to prevent the lower weight connection plates 614 and the upper weight connection plates 623 from interfering with a pivoting operation of the scaffolding member 64, as shown in FIG. 26, an opening 64J in which the scaffolding member 64 is partially cut out is formed at a position where the lower weight connection plates 614 and the upper weight connection plates 623 face each other.

With reference to FIGS. 23 and 24, the plurality of strut members 65 has a function to support the scaffolding members 64 by coupling tip sides of the scaffolding members 64 to the lower weight left side surface 61L and the lower weight right side surface 61R of the lower weight 61. One end of each strut member 65 is fixed to a scaffolding side installation part 64V of the scaffolding member 64 (FIG. 24), whereas the other end of the strut member 65 is fixed to a weight side installation part 61V of the lower weight 61 (FIG. 24). Note that as shown in FIG. 21, front end sides of outer side edges of the left and right direction of the one pair of scaffolding members 64 are inclined inward. Therefore, positions of the scaffolding side installation parts 64V disposed adjacent to each other in the front and rear direction are different in the left and right direction. As a result, as shown in FIG. 22, when the rear weight 54 is viewed from the rear, the plurality of strut members 65 are inclined at different angles. This makes it possible to easily check how the plurality of strut members 65 is installed.

Also in the present embodiment, in the projecting posture shown in FIGS. 21 to 25, the posture is adopted in which the one pair of scaffolding members 64 extends to project to right side frame 521 and left side frame 511 sides from a weight right side surface 60R and a weight left side surface 60L of the weight body 60. At this time, both ends of the left and right direction of the one pair of scaffolding members 64 are disposed close to the left side frame 511 and the right side frame 521 with a predetermined space. Furthermore, upper surface parts of the one pair of scaffolding members 64 (scaffolding upper surface parts) and a weight upper surface part 60T of the weight body 60 (upward upper surface part) are disposed in line with each other along the left and right direction. As a result, the one pair of scaffolding members 64 forms a moving passage that allows a worker to move between the one pair of side frames (left side frame 511 and right side frame 521) together with the weight upper surface part 60T.

Meanwhile, in the accommodation posture shown in FIGS. 26 to 28, the one pair of scaffolding members 64 is spaced more inside of the left and right direction from the one pair of side frames than in the projecting posture. Furthermore, upper surface parts of the scaffolding members 64 in the projecting posture (scaffolding upper surface parts) are disposed to overlap with the weight upper surface part 60T in the accommodation posture (FIGS. 26 to 28).

Note that in the present embodiment, when the one pair of scaffolding members 64 is in the accommodation posture, as shown in FIG. 26, outer side surfaces 64T of the scaffolding members 64 are disposed to come into contact with each other. Therefore, during transportation of the rear weight 54, vibration and rattling of the one pair of scaffolding members 64 are prevented. Also in the present embodiment, since coupling passages AW as in the second embodiment described above (see FIGS. 12 and 13) are formed, coupling between the rear weight 54 and the truck frame 50 is easily implemented.

The construction machine (crane 10) according to the embodiments of the present invention has been described above. Note that the present invention is not limited to these embodiments. As the construction machine according to the present invention, the following modified embodiments are possible.

(1) The above-described embodiments have been described using the crane 10 as a construction machine, but the present invention is not limited to these embodiments. The construction machine according to the present invention may be a machine of another aspect, such as a hydraulic excavator and an excavator.

(2) Also, the above-described embodiments have been described in an aspect in which the weight body 60 constituting the front weight 53 and the rear weight 54 includes the lower weight 61 and the upper weight 62, but the present invention is not limited to these embodiments. The weight body 60 may include a single heavy object, or an aspect in which three or more heavy objects are coupled to each other may be used.

(3) Also, the above-described embodiments have been described in an aspect in which the one pair of scaffolding members 63 is installed in each of the front weight 53 and the rear weight 54, but the present invention is not limited to these embodiments. For example, if a left side part of the rear weight 54 is disposed near the left side frame 511, the scaffolding member 63 (64) may be installed only on a right side of the rear weight 54. That is, an aspect in which at least one pair of front and rear scaffolding members 63 is provided in the front weight 53 and the rear weight 54 may be used.

(4) Also, the above-described embodiments have been described in an aspect in which ladders 57 are installed in the scaffolding members 63, but the present invention is not limited to these embodiments. An aspect in which the ladders 57 are installed in the front weight 53 and the rear weight 54 may be used. In this case, the ladders 57 enable the worker to move between the upper surface parts of the front weight 53 and the rear weight 54, and the ground.

Figure 29:
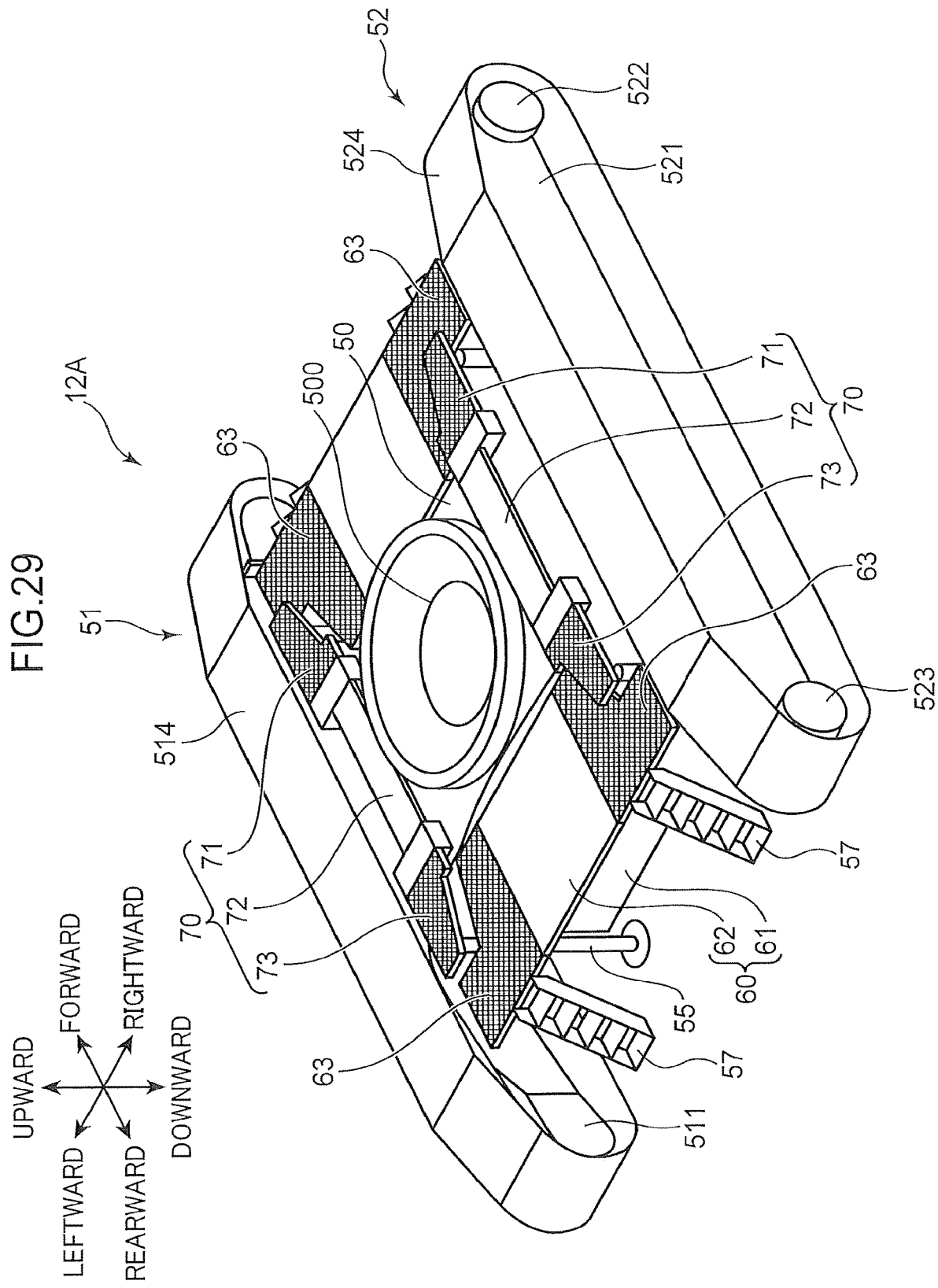
FIG. 29 is a perspective view of a lower travelling body of a construction machine according to a modified embodiment of the present invention.

(5) Also, the above-described embodiments have been described in an aspect in which one pair of front and rear moving passages TR is formed between the one pair of side frames, but the present invention is not limited to these embodiments. An aspect in which the moving passage TR is formed either frontward or rearward of the truck frame 50 may be used. Furthermore, FIG. 29 is a perspective view of a lower travelling body 12A of a construction machine according to a modified embodiment of the present invention. The present modified embodiment, which differs from the above embodiments in that the lower travelling body 12A includes truck frame scaffolding parts 70, will describe the difference and omit the description of other common points. Note that in FIG. 29, members having the same structure and functions as the members according to the first embodiment are denoted with the same reference signs as in FIGS. 1 to 11. Also, in FIG. 29, structure of the lower travelling body 12A excluding the truck frame scaffolding parts 70 can be referred to as the structure of the lower travelling body 12 of the first embodiment described above.

The lower travelling body 12A includes one pair of left and right truck frame scaffolding parts 70 (frame side scaffolding parts). The one pair of truck frame scaffolding parts 70 is scaffolding members fixed to both left and right sides of the truck frame 50. Note that the truck frame scaffolding parts 70 may be supported by the left side frame 511 and the right side frame 521, or parts of the truck frame scaffolding parts 70 may be supported by the truck frame 50 and the side frames 511 and 521. Each truck frame scaffolding part 70 includes a front scaffolding part 71, a central scaffolding part 72, and a rear scaffolding part 73. The front scaffolding part 71 is disposed adjacent to the front scaffolding member 63 and disposed above a jack up device 55 (FIG. 2). The central scaffolding part 72 is disposed outside the left and right direction of a slewing body axis support part 500 to couple the front scaffolding part 71 to the rear scaffolding part 73. The rear scaffolding part 73 is disposed adjacent to the rear scaffolding member 63 and disposed above the jack up device 55 (FIG. 2). Note that as shown in FIG. 29, the truck frame scaffolding parts 70 are disposed at positions slightly higher than the two pairs of front and rear scaffolding members 63. As a result, the truck frame scaffolding parts 70 are prevented from interfering with an expansion and contraction operation of the jack up devices 55.

In a mode shown in FIG. 29, the worker can move along the front and rear direction between the moving passages TR frontward and rearward of the truck frame 50 (FIG. 2) through the truck frame scaffolding parts 70. Therefore, the worker can move along the front and rear direction without riding on left crawler shoes 514 and right crawler shoes 524 (FIG. 2). Note that the truck frame scaffolding part 70 may be disposed only at one end of the left and right direction. In this case, the truck frame scaffolding part 70 is required to be disposed at least to couple the scaffolding member 63 on the front side of the truck frame 50 (front scaffolding member) to the scaffolding member 63 on the rear side (rear scaffolding member).

The present invention provides a construction machine. The construction machine includes: a lower travelling body configured to move on ground; and an upper slewing body supported by the lower travelling body in a slewable manner. The lower travelling body includes: a truck frame including a front surface part and a rear surface part, the truck frame supporting the upper slewing body; one pair of left and right side frames each supporting a crawler that allows circling movement, the one pair of left and right side frames being respectively coupled to both ends of a left and right direction of the truck frame to extend in a front and rear direction more than the truck frame; one pair of front and rear travelling body weights being respectively disposed on a front side and a rear side of the truck frame between the one pair of left and right side frames; and at least one pair of front and rear scaffolding members each including a scaffolding upper surface part facing upward and being respectively installed in the one pair of front and rear travelling body weights. Each of the one pair of front and rear travelling body weights includes a weight upper surface part facing upward, and one pair of left and right weight side surfaces respectively disposed facing the one pair of side frames. The scaffolding members are installed in the travelling body weights such that the scaffolding members project to sides of the side frames more than the weight side surfaces and the scaffolding upper surface parts and the weight upper surface part are in line with each other along the left and right direction. The scaffolding upper surface parts and the weight upper surface part form a moving passage that allows a worker to move between the one pair of left and right side frames.

With this configuration, the moving passage is formed by the travelling body weights and the scaffolding members between the one pair of side frames. Also, since the weight upper surface part of the travelling body weight and the scaffolding upper surface parts of the scaffolding members are disposed in line with each other along the left and right direction, the movement of the worker is implemented safely and easily.

In the configuration, preferably, the one pair of front and rear travelling body weights is respectively coupled to the front surface part and the rear surface part of the truck frame between the one pair of left and right side frames.

With this configuration, the one pair of front and rear travelling body weights can be stably supported by the truck frame.

In the configuration, preferably, the truck frame includes at least one pair of front and rear frame side coupling parts respectively disposed on the front surface part and the rear surface part, the at least one pair of front and rear frame side coupling parts being coupled to the travelling body weights, the one pair of front and rear travelling body weights include weight side coupling parts coupled to the frame side coupling parts, the weight side surfaces of the travelling body weights are spaced apart from the side frames in the left and right direction, the at least one pair of front and rear scaffolding members includes scaffolding lower surface parts facing downward, and the scaffolding lower surface parts of the scaffolding members and the weight side surfaces of the travelling body weights define coupling passages along the front and rear direction, the coupling passages allowing the worker to access the frame side coupling parts and the weight side coupling parts from front or rear of the travelling body weights through below the scaffolding members.

With this configuration, the worker can access the frame side coupling parts and the weight side coupling parts from front or rear of the travelling body weights through the coupling passages. Therefore, in the configuration in which the travelling body weight is coupled to the front surface part or the rear surface part of the truck frame, a coupling operation of both parts can be easily implemented.

In the configuration, preferably, the truck frame further includes two pairs of front and rear jack up devices respectively disposed to project from the front surface and the rear surface at positions to sandwich the frame side coupling parts from both sides of the left and right direction, the two pairs of front and rear jack up devices configured to support the lower travelling body, each of the travelling body weights is disposed at a position sandwiched by one pair of the jack up devices disposed on the front surface or the rear surface from both sides of the left and right direction, and the weight side surfaces of each of the travelling body weights are spaced apart from the jack up devices in the left and right direction, and the coupling passages are formed along the front and rear direction below the scaffolding members and between the weight side surfaces and the jack up devices.

With this configuration, the lower travelling body can be supported by the two pairs of front and rear jack up devices. Moreover, since the coupling passages are formed between the jack up devices and the travelling body weight, the worker can easily access the frame side coupling parts and the weight side coupling parts through the coupling passages.

In the configuration, preferably, first through holes are opened along the left and right direction in the frame side coupling parts, second through holes are opened along the left and right direction in the weight side coupling parts, and the lower travelling body further includes coupling pins to be inserted into the first through holes and the second through holes, the coupling pins coupling the travelling body weights and the truck frame to each other.

With this configuration, it is possible to easily couple the travelling body weights to the truck frame with the coupling pins.

In the configuration, preferably, the travelling body weights include storage parts configured to store the coupling pins.

With this configuration, the loss of the coupling pins is prevented with the travelling body weights being not coupled to the truck frame.

In the configuration, preferably, each of the storage parts is disposed on at least any one surface of the one pair of weight side surfaces and a side surface of each of the travelling body weights on an opposite side of the truck frame in the front and rear direction.

With this configuration, the worker can take out the coupling pins from the storage parts and promptly reach the frame side coupling parts and the weight side coupling parts.

In the configuration, preferably, each of the travelling body weights includes: a lower weight including an upper surface part; and an upper weight including an upper surface part and being detachable with respect to the upper surface part of the lower weight, both ends of the left and right direction of the upper weight are disposed flush with both ends of the left and right direction of the lower weight, or inside the left and right direction of the both ends of the left and right direction of the lower weight, and the upper surface part of the upper weight and the scaffolding upper surface part of each of the scaffolding members form the moving passage.

With this configuration, by separating the travelling body weight into two upper and lower weights, ease of transportation of the travelling body weight improves.

In the configuration, preferably, the scaffolding members are detachable with respect to the travelling body weights.

With this configuration, it is possible to transport the travelling body weights and the scaffolding members with the scaffolding members separated from the travelling body weights.

In the configuration, preferably, the lower travelling body further includes a ladder installable in the travelling body weights or the scaffolding members, the ladder allowing movement by the worker between ground and the weight upper surface part or the scaffolding upper surface part.

With this configuration, the worker can move directly from the ground onto the travelling body weights or the scaffolding members. In other words, access from the ground to the weight upper surface part of the travelling body weight and the one pair of side frames is better than in another weight structure in which the worker moves from the ground to part of the travelling body weight and then moves to the upper surface part of the travelling body weight.

In the configuration, preferably, the one pair of front and rear travelling body weights includes: a front travelling body weight installed in the front surface; and a rear travelling body weight installed in the rear surface, the at least one pair of front and rear scaffold members includes: an at least front scaffolding member installed in one end of the left and right direction of the front travelling body weight; and an at least rear scaffolding member installed in an end of the rear travelling body weight on an identical side to the front scaffolding member in the left and right direction, the lower travelling body further includes a frame side scaffolding part supported by the truck frame and at least one of the side frames, the frame side scaffolding part allowing movement by the worker between the front scaffolding member and the rear scaffolding member.

With this configuration, the worker can move between the moving passages frontward and rearward of the truck frame through the frame side scaffolding part.

In the configuration, preferably, the scaffolding members are configured to change a posture between: a projecting posture in which the scaffolding upper surface part faces upward, the scaffolding members extend to project to sides of the side frames more than the weight side surfaces, the scaffolding upper surface part and the weight upper surface part are disposed in line with each other along the left and right direction, and the moving passage is formed together with the weight upper surface part; and an accommodation posture in which the scaffolding members are spaced more inside of the left and right direction of the side frames than in the projecting posture, and the scaffolding members are disposed to overlap the weight upper surface part or the weight side surface.

With this configuration, the scaffolding members can change the posture between the projecting posture in which the moving passage is formed and the accommodation posture in which the amount of projecting on each side frame side is smaller than in the protruding posture. This makes it possible to transport the travelling body weight in a state where the scaffolding members in the accommodation posture are installed in the travelling body weight. Therefore, the space occupied by the scaffolding members on a platform of a transport vehicle becomes smaller than when the scaffolding members in the projecting posture are installed in the travelling body weight. Therefore, mixed transportation of the travelling body weight and other members becomes easy, and ease of transportation of the travelling body weight can be improved. Furthermore, since the scaffolding members are installed in the travelling body weight in the transportation stage, ease of assembly of the lower travelling body at a work site can be improved.

In the configuration, preferably, the scaffolding members include scaffolding back surface parts facing downward in the projecting posture, and the scaffolding back surface parts are disposed to overlap the weight side surfaces in the accommodation posture.

With this configuration, it is possible to reduce the space occupied by the travelling body weights and the scaffolding members on a platform of a transport vehicle.

In the configuration, preferably, the scaffolding upper surface part is disposed to overlap the weight upper surface part in the accommodation posture.

With this configuration, it is possible to reduce the space occupied by the travelling body weights and the scaffolding members on a platform of a transport vehicle.

In the configuration, preferably, the travelling body weights include support members including fulcrum parts and supporting the scaffolding members, and the scaffolding members change the posture between the projecting posture and the accommodation posture by pivoting on the fulcrum parts as a fulcrum.

With this configuration, the posture change of the scaffolding members can be easily implemented by the pivoting operation around the fulcrum parts.

The invention claimed is:

1. A construction machine comprising:
    a lower travelling body configured to move on ground; and
    an upper slewing body supported by the lower travelling body in a slewable manner, wherein
    the lower travelling body includes:
        a truck frame including a front surface part and a rear surface part, the truck frame supporting the upper slewing body;
        one pair of left and right side frames each supporting a crawler that allows circling movement, the one pair of left and right side frames being respectively coupled to both ends of a left and right direction of the truck frame to extend in a front and rear direction more than the truck frame;
        one pair of front and rear travelling body weights each including a weight upper surface part facing upward and one pair of left and right weight side surfaces respectively disposed facing the one pair of left and right side frames, the one pair of front and rear travelling body weights being respectively disposed on a front side and a rear side of the truck frame between the one pair of left and right side frames; and
        at least one pair of front and rear scaffolding members each including a scaffolding upper surface part facing upward, the at least one pair of front and rear scaffolding members being respectively installed in the one pair of front and rear travelling body weights to project to sides of the side frames more than the weight side surfaces, and
    the scaffolding upper surface part and the weight upper surface part are disposed in line with each other along the left and right direction, and form a moving passage that allows a worker to move between the one pair of left and right side frames.

2. The construction machine according to claim 1, wherein the one pair of front and rear travelling body weights is respectively coupled to the front surface part and the rear surface part of the truck frame between the one pair of left and right side frames.

3. The construction machine according to claim 2, wherein
    the truck frame includes at least one pair of front and rear frame side coupling parts respectively disposed on the front surface part and the rear surface part, the at least one pair of front and rear frame side coupling parts being coupled to the travelling body weights,
    the one pair of front and rear travelling body weights include weight side coupling parts coupled to the frame side coupling parts,
    the weight side surfaces of the travelling body weights are spaced apart from the side frames in the left and right direction, the at least one pair of front and rear scaffolding members includes scaffolding lower surface parts facing downward, and the scaffolding lower surface parts of the scaffolding members and the weight side surfaces of the travelling body weights define coupling passages along the front and rear direction, the coupling passages allowing the worker to access the frame side coupling parts and the weight side coupling parts from front or rear of the travelling body weights through below the scaffolding members.

4. The construction machine according to claim 3, wherein the truck frame further includes two pairs of front and rear jack up devices respectively disposed to project from the front surface and the rear surface at positions to sandwich the frame side coupling parts from both sides of the left and right direction, the two pairs of front and rear jack up devices configured to support the lower travelling body, each of the travelling body weights is disposed at a position sandwiched by one pair of the jack up devices disposed on the front surface or the rear surface from both sides of the left and right direction, and the weight side surfaces of each of the travelling body weights are spaced apart from the jack up devices in the left and right direction, and the coupling passages are formed along the front and rear direction below the scaffolding members and between the weight side surfaces and the jack up devices.

5. The construction machine according to claim 3 or 1, wherein first through holes are opened along the left and right direction in the frame side coupling parts, second through holes are opened along the left and right direction in the weight side coupling parts, and the lower travelling body further includes coupling pins to be inserted into the first through holes and the second through holes, the coupling pins coupling the travelling body weights and the truck frame to each other.

6. The construction machine according to claim 5, wherein the travelling body weights include storage parts configured to store the coupling pins.

7. The construction machine according to claim 6, wherein each of the storage parts is disposed on at least any one surface of the one pair of weight side surfaces and a side surface of each of the travelling body weights on an opposite side of the truck frame in the front and rear direction.

8. The construction machine according to claim 1, wherein each of the travelling body weights includes:
a lower weight including an upper surface part; and
an upper weight including an upper surface part and being detachable with respect to the upper surface part of the lower weight, both ends of the left and right direction of the upper weight are disposed flush with both ends of the left and right direction of the lower weight, or inside, in the left and right direction, of the both ends of the left and right direction of the lower weight, and the upper surface part of the upper weight and the scaffolding upper surface part of each of the scaffolding members form the moving passage.

9. The construction machine according to claim 1, wherein the scaffolding members are detachable with respect to the travelling body weights.

10. The construction machine according to claim 1, wherein the lower travelling body further includes a ladder installable in the travelling body weights or the scaffolding members, the ladder allowing movement by the worker between the ground and the weight upper surface part or the scaffolding upper surface part.

11. The construction machine according to claim 1, wherein the one pair of front and rear travelling body weights includes:
a front travelling body weight installed in the front surface; and
a rear travelling body weight installed in the rear surface, the at least one pair of front and rear scaffold members includes:
an at least front scaffolding member installed in one end of the left and right direction of the front travelling body weight; and
an at least rear scaffolding member installed in an end of the rear travelling body weight on an identical side to the front scaffolding member in the left and right direction, and the lower travelling body further includes a frame side scaffolding part supported by the truck frame and at least one of the side frames, the frame side scaffolding part allowing movement by the worker between the front scaffolding member and the rear scaffolding member.

12. The construction machine according to claim 1, wherein the scaffolding members are configured to change a posture between:

a projecting posture in which the scaffolding upper surface part faces upward, the scaffolding members extend to project to sides of the side frames more than the weight side surfaces, the scaffolding upper surface part and the weight upper surface part are disposed in line with each other along the left and right direction, and the moving passage is formed together with the weight upper surface part; and an accommodation posture in which the scaffolding members are spaced more inside, in the left and right direction, of the side frames than in the projecting posture, and the scaffolding members are disposed to overlap the weight upper surface part or the weight side surface.

13. The construction machine according to claim 12, wherein the scaffolding members include scaffolding back surface parts facing downward in the projecting posture, and the scaffolding back surface parts are disposed to overlap the weight side surfaces in the accommodation posture.

14. The construction machine according to claim 12, wherein the scaffolding upper surface part is disposed to overlap the weight upper surface part in the accommodation posture.

15. The construction machine according to claim 12, wherein the travelling body weights include support members including fulcrum parts and supporting the scaffolding members, and the scaffolding members change the posture between the projecting posture and the accommodation posture by pivoting on the fulcrum parts as a fulcrum.

* * * * *